United States Patent
Payne et al.

(10) Patent No.: US 11,529,862 B2
(45) Date of Patent: Dec. 20, 2022

(54) SYSTEMS AND METHODS FOR IMPROVING PROPULSION OF A VEHICLE USING SELECTIVELY ATTACHABLE HUB MOTORS AND ROTATABLE AXLES

(71) Applicant: Toyota Motor Engineering & Manufacturing North America, Inc., Plano, TX (US)

(72) Inventors: Joshua D. Payne, Ann Arbor, MI (US); Nathan C. Westover, New Hudson, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 397 days.

(21) Appl. No.: 16/704,788

(22) Filed: Dec. 5, 2019

(65) Prior Publication Data

US 2021/0094405 A1 Apr. 1, 2021

Related U.S. Application Data

(63) Continuation-in-part of application No. 16/588,041, filed on Sep. 30, 2019, and a continuation-in-part of
(Continued)

(51) Int. Cl.
*B60K 6/442* (2007.10)
*B60W 20/20* (2016.01)
*B60K 7/00* (2006.01)

(52) U.S. Cl.
CPC ............ *B60K 6/442* (2013.01); *B60K 7/0007* (2013.01); *B60W 20/20* (2013.01)

(58) Field of Classification Search
CPC ........ B60K 6/422; B60K 7/0007; B60K 7/00; B60W 20/20
See application file for complete search history.

(56) References Cited

U.S. PATENT DOCUMENTS

| 4,021,690 A | 5/1977 | Burton |
| 4,389,586 A | 6/1983 | Foster et al. |

(Continued)

FOREIGN PATENT DOCUMENTS

| CN | 102897016 A | * | 1/2013 | ............. B60K 7/00 |
| CN | 106696670 A | | 5/2017 | |

(Continued)

OTHER PUBLICATIONS

U.S. Appl. No. 16/588,041, filed Sep. 30, 2019, entitled Motive Wheel Comprising a Selectively Attachable and Detachable Hub Motor and Method of Making and Using the Same.
(Continued)

*Primary Examiner* — Tisha D Lewis
(74) *Attorney, Agent, or Firm* — Christopher G. Darrow; Darrow Mustafa PC

(57) ABSTRACT

Systems, methods, and other embodiments described herein relate to improving propulsion of a vehicle. In one embodiment, a method includes, in response to detecting a vehicle configuration associated with an arrangement of a set of hub motors that are selectively attachable on driven wheels of the vehicle, loading a control setting according to the arrangement to one of a series configuration and a parallel configuration to indicate a power source for the driven wheels as one or more of a motor of the set of hub motors and a central propulsion system. The set of hub motors is structured to be selectively attached to the driven wheels without removing the driven wheels from the vehicle. The method includes managing power delivery to the set of hub motors and the central propulsion system of the vehicle to propel the vehicle according to the control setting.

20 Claims, 9 Drawing Sheets

Related U.S. Application Data application No. 16/588,195, filed on Sep. 30, 2019, and a continuation-in-part of application No. 16/588,198, filed on Sep. 30, 2019.

(56) References Cited

U.S. PATENT DOCUMENTS

| | | | |
|---|---|---|---|
| 4,532,689 A * | 8/1985 | Harder | B23P 19/025 |
| | | | 29/824 |
| 5,720,533 A | 2/1998 | Pastor et al. | |
| 7,825,616 B2 | 11/2010 | Clark et al. | |
| 8,342,612 B2 | 1/2013 | Sgherri et al. | |
| 8,459,386 B2 | 6/2013 | Pickholz | |
| 8,720,615 B2 | 5/2014 | Wanger et al. | |
| 8,746,396 B2 | 6/2014 | Vallejo et al. | |
| 8,752,660 B2 | 6/2014 | Ajisaka | |
| 8,925,659 B2 | 1/2015 | Peters | |
| 8,955,793 B2 | 2/2015 | Sullivan | |
| 9,216,612 B2 | 12/2015 | Zdrahal et al. | |
| 9,248,733 B2 | 2/2016 | Mair et al. | |
| 9,428,265 B2 | 8/2016 | Cox | |
| 9,475,342 B2 | 10/2016 | Feng | |
| 9,616,706 B2 | 4/2017 | Benoit, Jr. | |
| 9,688,099 B2 | 6/2017 | Niemczyk | |
| 2004/0021437 A1 | 2/2004 | Maslov et al. | |
| 2004/0099455 A1 | 5/2004 | Nagaya | |
| 2007/0096586 A1 | 5/2007 | Cros et al. | |
| 2007/0251742 A1 | 11/2007 | Adams, III et al. | |
| 2007/0257570 A1 * | 11/2007 | Walter | B60K 7/0007 |
| | | | 310/67 R |
| 2008/0023237 A1 | 1/2008 | Houle | |
| 2011/0094807 A1 | 4/2011 | Pruitt et al. | |
| 2011/0124465 A1 | 5/2011 | Chen | |
| 2013/0333966 A1 | 12/2013 | Bryant | |
| 2014/0125205 A1 | 5/2014 | Landfors et al. | |
| 2015/0027795 A1 | 1/2015 | Hirai et al. | |
| 2017/0225684 A1 | 8/2017 | Alshamrani et al. | |
| 2018/0362109 A1 | 12/2018 | Vidolov | |
| 2019/0023128 A1 | 1/2019 | Tesar | |
| 2019/0134474 A1 * | 5/2019 | Schneiter | B60K 7/00 |
| 2019/0383340 A1 | 12/2019 | Seaman et al. | |
| 2021/0061005 A1 * | 3/2021 | Galang | B60K 1/02 |
| 2021/0061095 A1 | 3/2021 | Galang et al. | |
| 2021/0094406 A1 | 4/2021 | Payne et al. | |
| 2021/0094407 A1 | 4/2021 | Payne et al. | |

FOREIGN PATENT DOCUMENTS

| | | | | |
|---|---|---|---|---|
| CN | 107160995 A | * | 9/2017 | |
| DE | 2803739 A | * | 8/1978 | B60K 7/0015 |
| DE | 19948224 C1 | | 6/2001 | |
| EP | 2340953 A1 | | 7/2011 | |
| GB | 190928475 A | * | 6/1910 | |
| JP | 2017043213 A | * | 3/2017 | |
| SU | 1661004 A1 | * | 7/1991 | |

OTHER PUBLICATIONS

U.S. Appl. No. 16/588,195, filed Sep. 30, 2019, entitled Selectively Attachabi F and Detachable Axial Hub Motor.

U.S. Appl. No. 16/588,198, filed Sep. 30, 2019, entitled Systems and Methods for Improving Propulsion of a Vehicle Using Selectively Attachable Hub Motors.

* cited by examiner

SYSTEMS AND METHODS FOR IMPROVING PROPULSION OF A VEHICLE USING SELECTIVELY ATTACHABLE HUB MOTORS AND ROTATABLE AXLES

CROSS-REFERENCE TO RELATED APPLICATIONS

This application is a continuation-in-part of and claims priority from 1) U.S. application Ser. No. 16/588,041, filed Sep. 30, 2019, entitled "MOTIVE WHEEL COMPRISING A SELECTIVELY ATTACHABLE AND DETACHABLE HUB MOTOR AND METHOD OF MAKING AND USING THE SAME;" 2) U.S. application Ser. No. 16/588,195, filed Sep. 30, 2019, entitled "SELECTIVELY ATTACHABLE AND DETACHABLE AXIAL HUB MOTOR;" and 3) U.S. application Ser. No. 16/588,198, filed Sep. 30, 2019, entitled "SYSTEMS AND METHODS FOR IMPROVING PROPULSION OF A VEHICLE USING SELECTIVELY ATTACHABLE HUB MOTORS," which are incorporated by reference herein.

TECHNICAL FIELD

The subject matter described herein relates, in general, to systems and methods for improving propulsion of a vehicle, and, more particularly, to managing power delivery to a propulsion system including rotatable axles and hub motors that may be attached or detached without removal of a wheel from the vehicle.

BACKGROUND

Hybrid and electric vehicle manufacturers are continually exploring new propulsion mechanisms to remain competitive. Hub motors, i.e., electric motors directly integrated onto the wheels, are emerging as a viable technology that offers the manufactures more configurations when designing electrified powertrains. Some of the advantages of directly driving the wheels with electric motors include faster acceleration, as well as improved torque response and enhanced handling due to independent wheel control. In present configurations, designs integrate the hub motors with the wheels and do not provide for removal without first removing the entire wheel. The resulting hub motor/wheel assembly is expensive and heavy. Thus, manipulating the hub motor arrangement is not generally feasible as such operations would require extensive knowledge of a hub motor system and support from a dedicated service facility including trained service technicians.

SUMMARY

Example systems and methods are disclosed herein that relate to a manner of improving propulsion of a vehicle. In a first aspect, the disclosed hub motors incorporate a modular functionality such that they are removable and replaceable without disturbing the connection of the wheel to the vehicle. Accordingly, the location of the hub motor is toward the outside of the wheel, thus facilitating access to components of the hub motor and permitting a vehicle user to attach or detach the hub motor while leaving the wheel and associated tire mounted to the vehicle.

In a second aspect, the noted systems and methods recognize when an arrangement of the hub motors modifies a vehicle configuration that includes an existing central propulsion system, e.g., an internal combustion engine (ICE) and/or an electric motor. In one embodiment, the disclosed systems and methods detect when a set of hub motors is attached or detached to wheels of the vehicle that are driven by the existing central propulsion system. For example, where the set of hub motors are attached to the driven wheels, the noted systems and methods determine the resulting vehicle configuration and load an appropriate control setting that sets forth the management of power delivery to the set of hub motors and the central propulsion system. In this instance, the control setting includes a parallel configuration (i.e., the set of hub motors are in parallel with the central propulsion system with respect to the driven wheels), and the disclosed systems and methods operate the set of hub motors and the central propulsion system at a power level that satisfies a power demand of the vehicle.

In this way, a vehicle user can reconfigure the propulsion strategy of the vehicle by personally attaching/detaching hub motors to wheels of the vehicle driven by the central propulsion system without removing the driven wheel. Furthermore, the disclosed systems and methods remove the burden of manually re-calibrating the new vehicle configuration and automatically manage the power delivery to the hub motors and/or the central propulsion system.

In one embodiment, a power delivery system for improving propulsion of a vehicle is disclosed. The power delivery system includes rotatable axles rotatably coupled to a drivetrain and a central propulsion system rotatably coupled to the drivetrain. The power delivery system includes driven wheels rotatably coupled to the rotatable axles, and a set of hub motors structured to be selectively attached to the driven wheels without removing the driven wheels from the vehicle.

In one embodiment, a method of improving propulsion of a vehicle is disclosed. The method includes, in response to detecting a vehicle configuration associated with an arrangement of a set of hub motors that are selectively attachable on driven wheels of the vehicle, loading control settings according to the arrangement to one of a series configuration and a parallel configuration to indicate a power source for the driven wheels as one or more of a motor of the set of hub motors and a central propulsion system. The set of hub motors is structured to be selectively attached to the driven wheels without removing the driven wheels from the vehicle. The method includes managing power delivery to the set of hub motors and the central propulsion system of the vehicle to propel the vehicle according to the control settings.

In another embodiment, a power delivery system for improving propulsion of a vehicle is disclosed. The power delivery system includes rotatable axles rotatably coupled to a drivetrain and a central propulsion system rotatably coupled to the drivetrain. The power delivery system includes driven wheels rotatably coupled to the rotatable axles and a set of hub motors structured to be selectively attached to the driven wheels without removing the driven wheels from the vehicle. Hub motors of the set of hub motors include a rotor and a stator. The rotor mounts to one of the rotatable axles, and the stator mounts to one of the driven wheels that corresponds to the one of the rotatable axles. The power delivery system includes a drive controller having one or more processors and a memory communicably coupled to the one or more processors. The memory stores a detection module including instructions that when executed by the one or more processors cause the one or more processors to, in response to detecting a vehicle configuration associated with an arrangement of the set of hub motors that are selectively attachable on the driven wheels, load control settings according to the arrangement to one of a series configuration and a parallel configuration to indicate a power source for the driven wheels as one or more of a motor of the set of hub motors and the central propulsion system. The memory stores a managing module including instructions that when executed by the one or more processors cause the one or more processors to manage power delivery to the set of hub motors and the central propulsion system to propel the vehicle according to the control settings.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
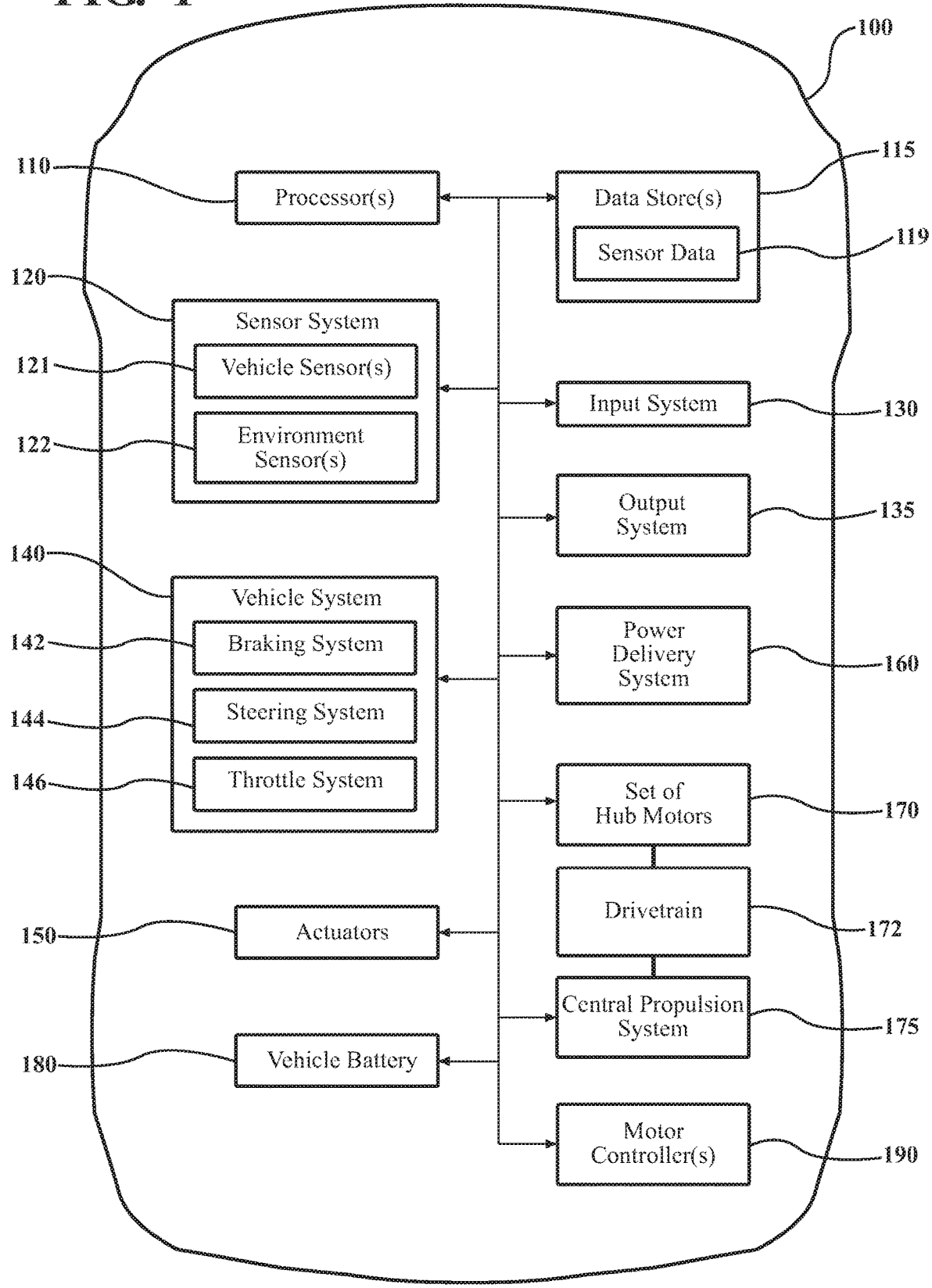
FIG. 1 illustrates one embodiment of a vehicle within which systems and methods disclosed herein may be implemented.

Systems, methods, and other embodiments associated with improving propulsion of a vehicle are disclosed. As alluded to previously, improving propulsion, as described herein, involves a vehicle platform that is configurable (e.g., by a user) to meet the intended purposes of a vehicle user while at the same time removing the burden of involving a dedicated service facility. To enable such a feature, a power delivery system, in one embodiment, includes a central propulsion system rotatably coupled via rotatable axles to driven wheels of the vehicle and a set of hub motors selectively attachable to the driven wheels. Furthermore, the set of hub motors is structured to be attached or detached to/from the driven wheels without removing the driven wheels from the vehicle.

Thus, by way of an example, if a vehicle requires additional torque beyond what can be provided by an existing central propulsion system to tow a heavy load, the system provides for attaching the set of hub motors to the driven wheels to provide extra propulsion. The power delivery system detects the resulting vehicle configuration and loads a control setting to indicate a power source for the driven wheels. In this case, the power delivery system loads a parallel configuration to indicate the power source is multiple motors comprising the set of hub motors and the central propulsion system, e.g., an ICE and/or a central electric motor. The power delivery system then manages the power delivery to the motors to propel the vehicle, thus providing the extra torque.

The structure of the hub motor has a novel configuration of components that provide for securing the hub motor to an outward-facing surface of a vehicle wheel. The components include a rotor and a stator, and the outward placement of the rotor and the stator permit the vehicle user to attach/detach the hub motor to/from the wheel. For example, the vehicle user can attach/detach the rotor and the stator by engaging with accessible mechanical mechanisms that couple the components to the wheel without disturbing the wheel or tire mounting, as described below. The outer disposition and associated accessibility of the hub motor, as well as the mechanical coupling mechanisms, offer more versatility and convenience in the service, repair, replacement, and upgrade of the hub motors.

Furthermore, the power delivery system, in one arrangement, can detect an immobile state of the vehicle (e.g., one of the driven wheels has poor traction or is not in contact with the roadway) that prevents the vehicle from moving. When the power delivery system detects the immobile state, the power delivery system, in one arrangement, electronically actuates brakes that are part of the driven wheels such that torque transfers between the driven wheels. In particular, the power delivery system actuates the brake of the driven wheel with limited or no traction and energizes the central propulsion system and the set of hub motors to apply torque to the driven wheel having traction, which may remedy the immobile state of the vehicle.

Referring to FIG. 1, an example of a vehicle 100 is illustrated. As used herein, a "vehicle" is any form of powered vehicle transport. In one or more implementations, the vehicle 100 is an automobile. While arrangements will be described herein with respect to automobiles, it will be understood that embodiments are not limited to automobiles. In some implementations, the vehicle 100 may be any other form of vehicle transport (e.g., sport utility vehicles (SUV), trucks, recreation vehicles (RV's), all-terrain vehicles (ATV's), hybrid electric vehicles (HEV), buses, etc.) that, for example, includes the ability to electrically power hub motors and benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a power delivery system 160 that is implemented to perform methods and other functions as disclosed herein relating to improving propulsion of the vehicle 100. Additionally, the vehicle 100 is illustrated as including a set of hub motors 170 coupled to a central propulsion system 175 via a drivetrain 172. It should be noted that the set of hub motors 170 includes one or more hub motors 170'. In various implementations, the power delivery system 160 manages power delivery to the set of hub motors 170 and the central propulsion system 175 to propel the vehicle 100. Initially presented is a discussion of a novel configuration that provides for selective attachment/detachment of the set of hub motors 170 to/from wheels of the vehicle 100 while the wheel remains mounted to the vehicle 100. Attention will then turn back to the power delivery system 160, and the noted functions and methods will become more apparent with a further discussion of the associated figures.

Figure 2:
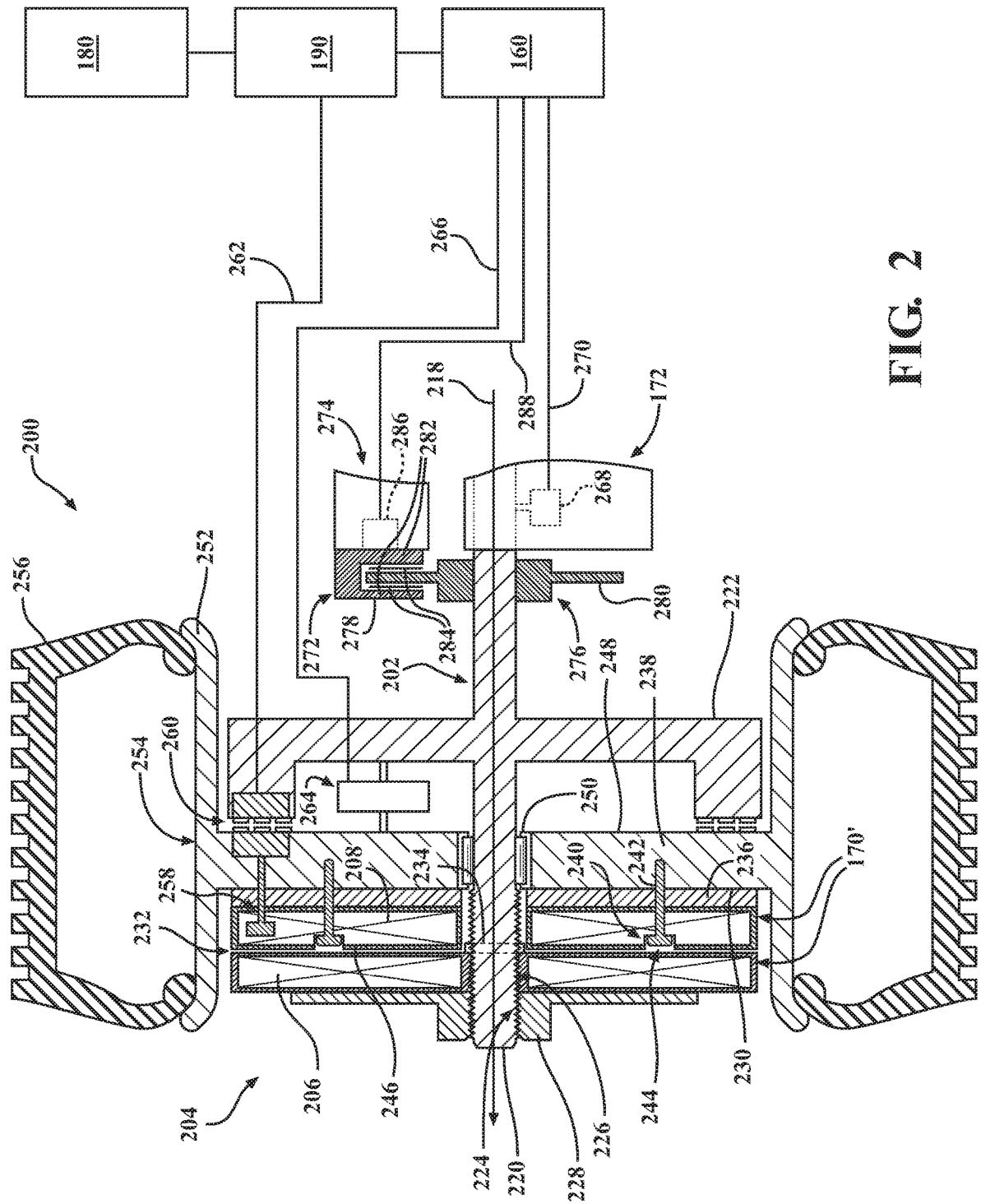
FIG. 2 illustrates a cross-sectional view of one embodiment of a wheel system for a vehicle.
Figure 3:
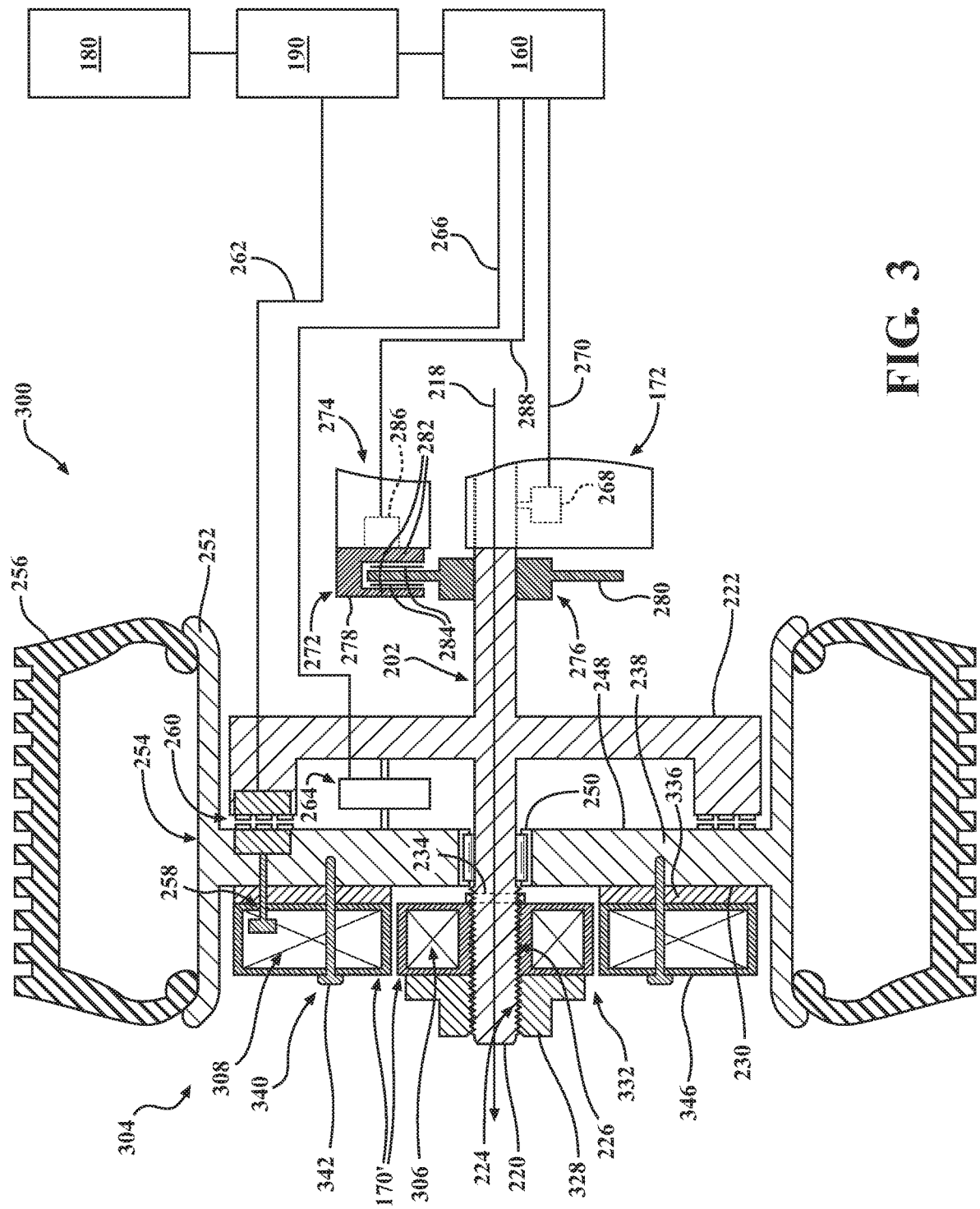
FIG. 3 illustrates a cross-sectional view of another embodiment of a wheel system for a vehicle.

FIG. 2 illustrates a cross-sectional view of a wheel system 200 of the vehicle 100 that includes a rotatable axle 202, a driven wheel 204, and the hub motor 170' of the set of hub motors 170. The hub motor 170' includes a cylindrical rotor 206 and a cylindrical stator 208 with an axial arrangement. In other words, the alignment of the cylindrical rotor 206 and the cylindrical stator 208 is along the rotatable axle 202, as described in more detail below. FIG. 3 illustrates a cross-sectional view of a wheel system 300 that is similar to the wheel system 200 of FIG. 2 except for the arrangement of the rotor and the stator. The hub motor 170' associated with the wheel system 300 includes a cylindrical rotor 306 and a cylindrical stator 308 having a radial arrangement, i.e., the alignment of the cylindrical rotor 306 and the cylindrical stator 308 is radially outward away from the rotatable axle 202. As set forth below, the arrangement of the rotor and the stator may allow for different mechanical properties of the wheel system 200, 300, e.g., torque delivery, speed capability, etc. For reasons of efficiency, the wheel system 200 will be described in detail to illustrate how the hub motor 170' is attachable/detachable without removing the driven wheel 204, and differences with the wheel system 300 having a driven wheel 304 will be noted.

Accordingly, the driven wheel 204 of the wheel system 200 is rotatably coupled to the rotatable axle 202. The rotatable axle 202 is rotatably coupled to a drivetrain 172 (FIG. 1) of the vehicle 100, as described further below. The rotatable axle 202 may rotate relative to the driven wheel 204. The rotatable axle 202 comprises an axle that may be a front axle, a rear axle, or a supplemental axle, e.g., for multi-axle trucks, large recreation vehicles, etc. The rotatable axle 202 and one or more of the wheel systems 200 may comprise steerable wheels or non-steerable wheels.

The rotatable axle 202 extends away from the vehicle 100 in an axial direction 218 to an outer end 220 of the rotatable axle 202. The rotatable axle 202 includes a cylindrical axle hub 222 disposed inwardly from the outer end 220 (e.g., between the outer end 220 and the vehicle 100) that extends radially outward away from the rotatable axle 202. For example, the cylindrical axle hub 222 has a cylindrical shape, including various cylindrical disks, such as a hollowed cylindrical disk with an outwardly opening U-shape cross-section, as shown in FIG. 2.

The rotatable axle 202 is formed from, for example, various metals, such as various alloys of steel, aluminum, magnesium, and titanium, and composites, such as various polymer/fiber composites. The rotatable axle 202 includes, for example, a cylindrical axle having, e.g., a hollow center, a solid center, etc.

The rotatable axle 202 comprises an axle attachment 224 for attachment of a cylindrical rotor 206 of the hub motor 170' proximate to the outer end 220. The axle attachment 224 has engagement configurations, e.g., screw threads, splines, etc. In one embodiment, the axle attachment 224 comprises a plurality of axle screw threads formed into an outer surface of the rotatable axle 202, as shown in FIG. 2. The axle attachment 224 is configured to engage a plurality of mating attachments, e.g., screw threads, splines, etc. In one embodiment, the axle attachment 224 mates with a plurality of rotor screw threads formed into a rotor attachment 226 of the cylindrical rotor 206, as shown in FIG. 2. In one embodiment, the rotor attachment 226 of the cylindrical rotor 206 comprises a cylindrical surface and defines a cylindrical opening, and the rotor screw threads are disposed thereon.

In one embodiment, the cylindrical rotor 206 is attached to and positioned on the rotatable axle 202 by threading the rotor screw threads of the rotor attachment 226 onto the rotatable axle 202. The cylindrical rotor 206 may be detached and removed from the rotatable axle 202 by unthreading the rotor screw threads from the rotatable axle 202 and axle screw threads. Other suitable attachments 224, 226 are possible for securing the cylindrical rotor 206 to the rotatable axle 202, such as cotter pins, ring clips, lugs, splines, etc.

In one or more arrangements, as shown in FIGS. 2-3, the cylindrical rotor 206, 306, is secured onto the rotatable axle 202 by a cylindrical rotor cap 228, 328 having a cylindrical ring shape that comprises, for example, screw thread, splines, etc. In one embodiment, the cylindrical rotor cap 228, 328 includes cap screw threads on an inner diameter that are configured to engage the axle screw threads of the axle attachment 224.

In one arrangement, the position of the cylindrical rotor 206 along the rotatable axle 202 may be at a predetermined rotor position ($P_R$) as measured along the length of the rotatable axle 202 from the outer end 220 and/or away from an outer wheel surface 230 of the driven wheel 204. In one embodiment, the predetermined rotor position ($P_R$) provides a predetermined axial alignment with a cylindrical stator 208 of the hub motor 170. For example, the selection of the predetermined rotor position ($P_R$) establishes an air gap 232 that corresponds to a predetermined axial magnetic flux when the hub motor 170' is powered, as described herein. For the wheel system 300, an air gap 332 is determined by the radial geometries of the cylindrical rotor 306 and the cylindrical stator 308. The radial geometries, in one embodiment, are selected to provide the air gap 332 that corresponds to a predetermined radial magnetic flux when the hub motor 170' is powered. The predetermined rotor position ($P_R$) of the cylindrical rotor 306 of the wheel system 300 is selected to provide a predetermined axial alignment with the cylindrical stator 308 to, for example, maximize the flux transfer between the cylindrical rotor 306 and the cylindrical stator 308. In one embodiment, a rotor stop 234 disposed on the rotatable axle 202 establishes the predetermined rotor position ($P_R$). For example, the rotor stop 234 is a threaded bolt, threaded pin, a snap ring, or the like, to establish and fix $P_R$ as the cylindrical rotor 206, 306 is threaded onto the rotatable axle 202.

As shown in FIGS. 2 and 3, the cylindrical stator 208, 308 is also fixed in a predetermined stator position ($P_S$) from the outer wheel surface 230 by a stator spacer 236, 336 disposed between the cylindrical stator 208, 308 and a wheel hub 238 of the driven wheel 204, 304, respectively. For example, the predetermined stator position ($P_S$) from the outer wheel surface 230 is defined by a thickness of the stator spacer 236, 336. The defined axial alignment of cylindrical rotor 206, 306 and cylindrical stator 208, 308 is a parameter that is configurable to provide a predetermined magnetic flux for the operation of the hub motor 170'. In one embodiment, the stator spacer 236, 336 comprises a cylindrical ring having an inner diameter and outer diameter selected to conform to an inner diameter and outer diameter of the cylindrical stator 208, 308, respectively, as shown in FIGS. 2-3.

In one embodiment, the stator spacer 236, 336 is formed of metallic materials, such as alloys of steel, aluminum, magnesium, and titanium. Metals are advantageous materials for use as the stator spacer 236, 336, as well as the driven wheel 204, 304 because metals have high thermal conductivity and can be configured as heat sinks to remove heat generated by the hub motor 170, particularly the cylindrical stator 208, 308 during operation.

The cylindrical stator 208, 308 in one arrangement, attaches to the stator spacer 236, 336 and the outer wheel surface 230 using two or more stator attachments 240, 340. Accordingly, the stator attachments 240, 340 receive threaded stator fasteners 242, 342, respectively. In the case of an axially arranged hub motor 170' of the wheel system 200, the stator attachments 240 include countersinks 244. In one embodiment, the stator attachments 240, 340 are aligned along the rotatable axle 202 in the axial direction 218 to receive the stator fasteners 242, 342 that couple the cylindrical stator 208, 308 to the stator spacer 236, 336 and the outer wheel surface 230. In one arrangement, the stator attachments 240, 340 circumferentially extend about an outer stator surface 246, 346 of the cylindrical stator 208, 308, respectively. The threaded stator fasteners 242, 342, in one embodiment, are threaded into a plurality of corresponding hub bores formed within the wheel hub 238. It should be noted that the threaded stator fasteners 242 may have different lengths than the threaded stator fastener 342 due to respective thicknesses of the cylindrical stator 208 and the cylindrical stator 308.

Referring to FIG. 2, the driven wheel 204 is disposed between the cylindrical axle hub 222 and the outer end 220. The driven wheel 204 includes the outer wheel surface 230, an inner wheel surface 248, and the wheel hub 238. The wheel hub 238 extends radially outward away from, and configured for reversible rotatable disposition on, the rotatable axle 202. The wheel hub 238 is supported by the rotatable axle 202 and is rotatable about a rotational axis that coincides with the axial direction 218. The wheel hub 238 is configured to be rotatably coupled to the rotatable axle 202. The rotatable coupling is accomplished by, for example, various configurations of rotatable bushings or bearings. In one embodiment, the rotatable device comprises a wheel bearing 250.

The driven wheel 204 includes, in one arrangement, a wheel rim 252 that is attached to and circumferentially extending about the wheel hub 238. The wheel rim 252 includes an outer rim surface 254 configured to receive a tire 256. The cylindrical axle hub 222 is disposed proximate the inner wheel surface 248 and the wheel rim 252. The driven wheel 204 may have any suitable size, including any suitable wheel diameter or width of the wheel hub 238 or the wheel rim 252. The size of the driven wheel 204 may be selected, and the driven wheel 204 configured to accept the tire 256 of any size. The driven wheel 204 may be made of a suitable high strength material, including various metals, such as, for example, alloys of steel, aluminum, titanium, and magnesium.

The wheel system 200 includes the hub motor 170' that, in one embodiment, is selectively attachable and detachable to/from the driven wheel 204. The hub motor 170' is disposed between the wheel hub 238 (i.e., the outer wheel surface 230) and the outer end 220 in the axial direction 218. For the wheel system 200, the cylindrical rotor 206 and the cylindrical stator 208 are coaxially spaced along the rotatable axle 202, and the cylindrical stator 208 is disposed between the cylindrical rotor 206 and the wheel hub 238. For the wheel system 300, the cylindrical rotor 306 is concentrically disposed within the cylindrical stator 308, and the cylindrical rotor 306 and the cylindrical stator 308 extend radially outward from the rotatable axle 202. The cylindrical rotor 206, 306 includes the rotor attachment 226 to selectively couple the cylindrical rotor 206, 306 to the rotatable axle 202. The cylindrical stator 208, 308 includes the stator attachments 240, 340 to selectively couple the cylindrical stator 208, 308 to the outer wheel surface 230 of the driven wheel 204, 304.

Furthermore, in one embodiment, the cylindrical rotor 206 and the cylindrical stator 208 are selectively attachable to the rotatable axle 202 and the outer wheel surface 230, respectively, without removing or dismounting the driven wheel 204 from the vehicle 100. Because the wheel hub 238 is rotatably disposed on the rotatable axle 202, the cylindrical stator 208 is rotatable about rotatable axle 202 due to being attached to the wheel hub 238

Other arrangements of the cylindrical rotor 206 and the cylindrical stator 208 are possible such that the hub motor 170' is attachable/detachable from an outward-facing surface of the driven wheel 204 without removing or unmounting the driven wheel 204. For example, the hub motor 170' may include more than one rotor and/or more than one stator. The hub motor 170' may have a different arrangement of the cylindrical rotor 206 and the cylindrical stator 208, e.g., a transversal flux configuration. It should be appreciated that the other arrangements still allow the vehicle user to attach and detach the hub motor 170' without frustrating the concept of not involving a dedicated service facility, e.g., no special tools, reasonable time to attach/detach the hub motor 170' to/from the driven wheel 204, no special training, etc.

The hub motor 170', in one arrangement, is an electric machine having the configuration of the cylindrical rotor 206, 306 and the cylindrical stator 208, 308 described herein, including various alternating current (AC) and direct current (DC) powered electric motors. Additionally, the hub motor 170' may include brushed (BDC) motors and brushless (BLDC) motors. In one embodiment, the hub motor 170' is a three-phase high-voltage AC electric motor.

Referring back to FIG. 1, the vehicle 100 includes the drivetrain 172. One or more of the rotatable axles 202 and the central propulsion system 175 are rotatably coupled to the drivetrain 172. The drivetrain 172 includes one or more of a transmission, a differential, a transaxle, driveshafts, clutches, axle halfshafts, a transfer case, etc. For example, the transmission of the drivetrain 172 mounts to the central propulsion system 175, and the driveshaft rotatably couples the transmission to the differential via constant-velocity joints. Further, the constant-velocity joints may rotatably couple the differential to the rotatable axles 202. It should be noted that the driven wheel 204, 304 may be propelled by the central propulsion system 175, the hub motor 170', or both, as set forth below. Other suitable configurations are possible for rotatably coupling the rotatable axles 202 and the central propulsion system 175 to the drivetrain 172.

The vehicle 100 includes the central propulsion system 175. The central propulsion system 175, in one arrangement, includes at least one of an internal combustion engine (ICE) and an electric motor. When both the ICE and the electric motor are present, the configuration of the central propulsion system 175 may be, for example, a series hybrid, a parallel hybrid, or a power-split/series-parallel hybrid, etc. The vehicle 100 may include one or more central propulsion systems 175. For example, the configuration of the central propulsion system 175 may be a through the road (TTR) hybrid, e.g., the ICE and an associated ICE drivetrain powers one axle and the electric motor and an associated electric motor drivetrain powers the other axle. In this case, the set of hub motors may include four or more hub motors 170'. Alternatively, one of the driven wheels 204, 304 on a particular axle (e.g., the front axle, the rear axle, the supplemental axle) may be driven by the central propulsion system 175 and the other driven wheel 204, 304 on the same axle may be driven by the hub motor 170' and the central propulsion system 175.

In various embodiments, the vehicle 100 includes an energy storage device (ESD) utilized for vehicle propulsion. For example, the ESD may include batteries, fuel cells, etc., or a combination thereof. In one embodiment, the vehicle 100 includes a vehicle battery 180 that comprises battery electrodes and electrolytes, including, in one or more implementations, lithium-ion, and lithium-ion polymer batteries. For example, the vehicle battery 180 is configured to provide voltage and power levels suitable for vehicle propulsion.

The vehicle 100 includes, in one arrangement, one or more motor controllers 190. The motor controllers 190 include power electronics (e.g., power converters, power inverters, etc.) to condition the voltage and current needed by the AC electric motor. For example, a power inverter, as known in the art, transforms a DC voltage and current from the vehicle battery 180 to an appropriate AC voltage and current needed by the AC electric motor. In one arrangement, the power delivery system 160 configures the motor controllers 190 to output electrical power that corresponds to powering the set of hub motors 170 at various power levels, as set forth below. In one instance, the motor controllers 190 are standalone sub-components of the vehicle 100, as shown in FIG. 1. Alternatively, the motor controllers 190 may be integrated with the vehicle battery 180, disposed in the wheel system 200, 300, and more particularly, on the cylindrical stator 208, or located elsewhere in the vehicle 100. Further, the motor controllers 190 or sub-components of the motor controllers 190 are, for example, integrated with the power delivery system 160.

The electric power for operation of the set of hub motors 170 is provided by the vehicle battery 180 via the motor controllers 190 through a series of electrical connection mechanisms to the cylindrical stator 208. For example, the series of electrical connection mechanisms include an electrical interface 258 of the hub motor 170, a rotary power interface 260, and an electrical power bus 262. In one embodiment, the electrical interface 258 is disposed within the cylindrical stator 208 and includes an exposed and accessible connector for coupling with the rotary power interface 260. Furthermore, the rotary power interface 260 couples with the electrical power bus 262. The series of electrical connection mechanisms allow the hub motor 170' to receive the electrical power from the vehicle battery 180 to power and control the hub motor 170'.

The rotary power interface 260, for example, may include one or more electrical slip rings disposed on and between the wheel hub 238, i.e., the inner wheel surface 248, and the cylindrical axle hub 222. In one embodiment, the rotary power interface 260 electrically connects with the exposed connector of the electrical interface 258, which is rotatable, and the electrical power bus 262 is disposed in the cylindrical axle hub 222, which is not rotatable. It should be appreciated that the electrical power bus 262 can be disposed within the rotatable axle 202 as well. The exposed connector of the electrical interface 258 can be, for example, a pigtail including a direct connection to the cylindrical stator 208 and connectable to the rotary power interface 260 on the wheel hub 238. As another example, the exposed connector can directly interface to a wiring harness located in the wheel hub 238 that includes the rotary power interface 260.

In one or more arrangements, the electrical power bus 262 includes a low power wiring harness for controlling the hub motor 170. For example, the low power wiring harness may be wired alongside high power conductors of the electrical power bus 262 and connected from power delivery system 160 through the motor controller 190 and the series of electrical connection mechanisms to the cylindrical stator 208.

Figure 4:
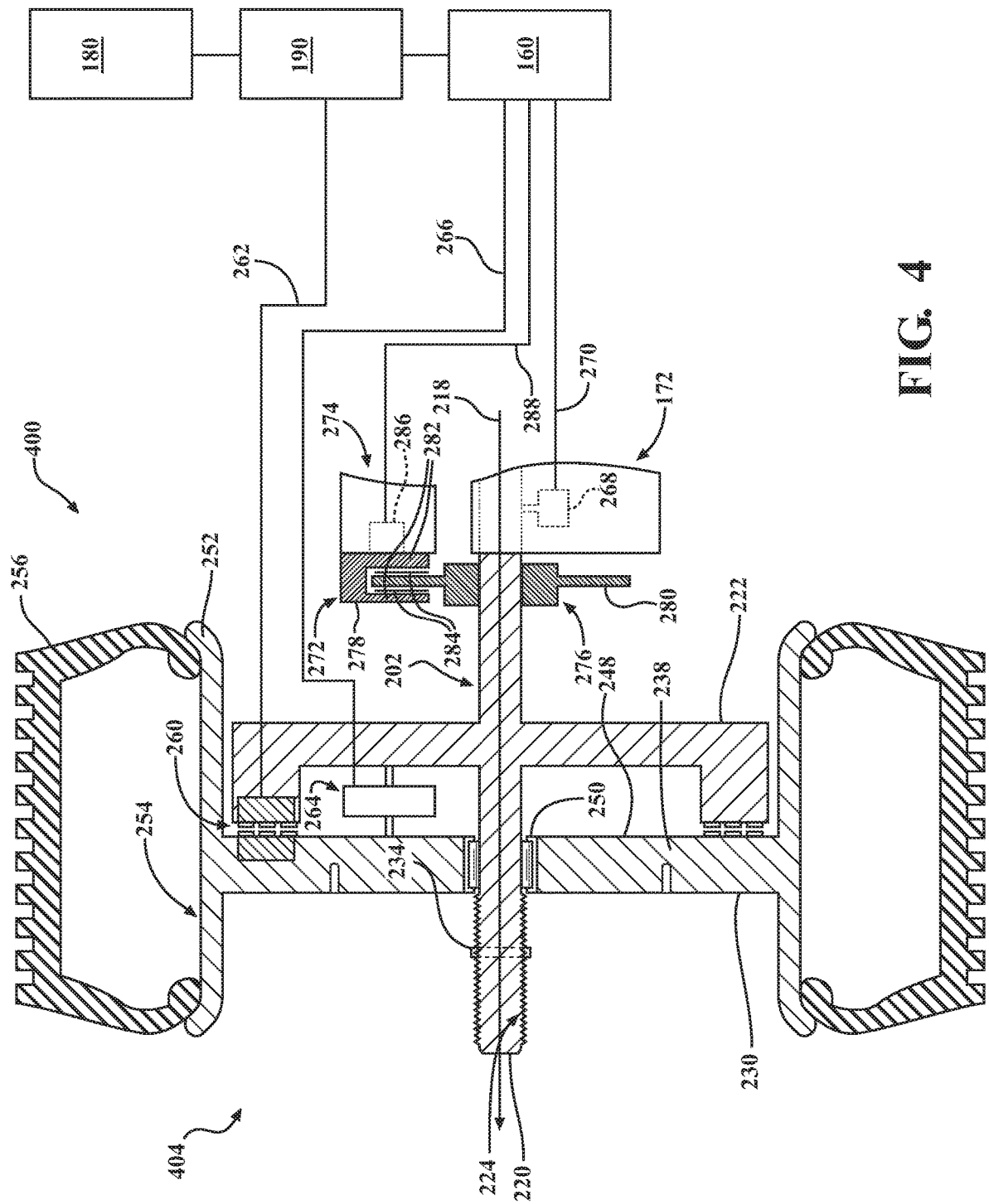
FIG. 4 illustrates a cross-sectional view of a wheel with a hub motor detached.

FIG. 4 illustrates a cross-sectional view of a wheel system 400 of the vehicle 100 that includes the rotatable axle 202 and a driven wheel 404. Although the hub motor 170' is detached, the driven wheel 404 still receives power, but only from one source of power, namely the central propulsion system 175. Advantageously, in one embodiment, the wheel system 400 comprises the same construction and same common components as the wheel systems 200 and 300. Accordingly, this arrangement enables the wheel system 400 to receive the hub motor 170', which in turn changes a vehicle configuration from a vehicle including the wheel system 400 to a vehicle including the wheel system 200 or 300. Stated another way, selectively attaching and detaching the cylindrical rotors 206, 306 and the cylindrical stators 208, 308 to/from the driven wheels 204, 304, and 404 enable the vehicle user to change how the driven wheels 204, 304, and 404 are driven, e.g., by the hub motor 170', by the central propulsion system 175, or both.

As shown in FIGS. 2-4, the wheel systems 200, 300, and 400 include a wheel clutch 264. The wheel clutch 264 mechanically couples the wheel hub 238 to the rotatable axle 202. The wheel clutch 264, in one arrangement, is controlled and powered by power delivery system 160 via a wheel clutch bus 266. For example, the power delivery system 160 detects the vehicle configuration associated with an arrangement of the set of hub motors 170. Depending on whether the set of hub motors 170 are attached or detached, the power delivery system 160 controls the wheel clutch 264 accordingly, as set forth below. The wheel clutch 264 may be configured to prevent relative rotation between the wheel hub 238 and the rotatable axle 202 in one or both directions when energized by the power delivery system 160. Alternatively, the wheel clutch 264 enters a "freewheel" state when not energized by the power delivery system 160. In other words, the relative rotation between the wheel hub 238 and the rotatable axle is unrestricted when the wheel clutch is de-energized.

The drivetrain 172 includes a drivetrain clutch 268. The drivetrain clutch 268 selectively prevents the rotatable axles 202 from rotating. The drivetrain clutch 268, in one arrangement, is controlled and powered by the power delivery system 160 via a drivetrain clutch bus 270. For example, the drivetrain clutch 268 may be a part of the transmission of the drivetrain 172, and when energized by the power delivery system 160, the drivetrain clutch 268 locks the output of the transmission, which prevents the differential of the drivetrain 172 from rotating. Alternatively, for example, the drivetrain clutch 268 unlocks the output of the transmission when not energized by the power delivery system 160, i.e., the rotatable axles 202 are free to rotate according to the differential. The power delivery system 160, in one or more arrangements, controls the wheel clutch 264, the drivetrain clutch 268, the set of hub motors 170, and the central propulsion system 175 according to the vehicle configuration and a power demand to propel the vehicle 100, as described in detail below.

In one embodiment the wheel systems 200, 300, and 400 include a brake 272 coupled to the rotatable axle 202 and the vehicle 100 via a chassis member 274. For example, the chassis member 274 is a mechanical fastening mechanism that includes a vehicle suspension. As shown in FIGS. 2-4, the position of the brake 272 is between the cylindrical axle hub 222 and the drivetrain 172 in the axial direction 218. The positioning of the brake 272 may be in other locations along the rotatable axle 202. For example, the position of the brake 272 may be between the wheel hub 238 and the cylindrical axle hub 222. The brake 272 is configured to apply a mechanical braking force to the driven wheel 204, 304, 404 and the tire 256 to slow the vehicle 100 when it is in motion, or to maintain the position of the driven wheel 204, 304, 404 when the vehicle 100 is at rest.

In one embodiment, the brake 272 comprises a brake rotor 276 and a caliper 278. The brake rotor 276 is rigidly fixed to the rotatable axle 202 and extends radially outward away from the rotatable axle 202 to a caliper portion 280. The caliper 278 comprises selectively movable caliper legs 282 and is rigidly fixed to the chassis member 274. The selectively movable caliper legs 282 are configured to receive friction brake pads 284 disposed thereon. The selectively movable caliper legs 282 and friction brake pads 284 are configured for pressed engagement against the caliper portion 280 to apply the mechanical braking force.

The brake rotor 276 comprises a cylindrical ring, and the caliper portion 280 is configured for friction braking of the vehicle 100 with the friction brake pads 284. The caliper 278 is configured for actuation as described herein to provide a braking action to the rotatable axle 202. The caliper 278 may be actuated to move the friction brake pads 284 inwardly and compress them against the caliper portion 280 by any suitable actuator, including a hydraulic actuator (not shown) or a brake actuator 286. The brake actuator 286 may include any suitable electrical actuator, including an electric motor or an electric solenoid. The brake actuator 286, in one arrangement, is controlled and powered by a brake power bus 288 with any suitable vehicle controller, e.g., the power delivery system 160.

Figure 5:
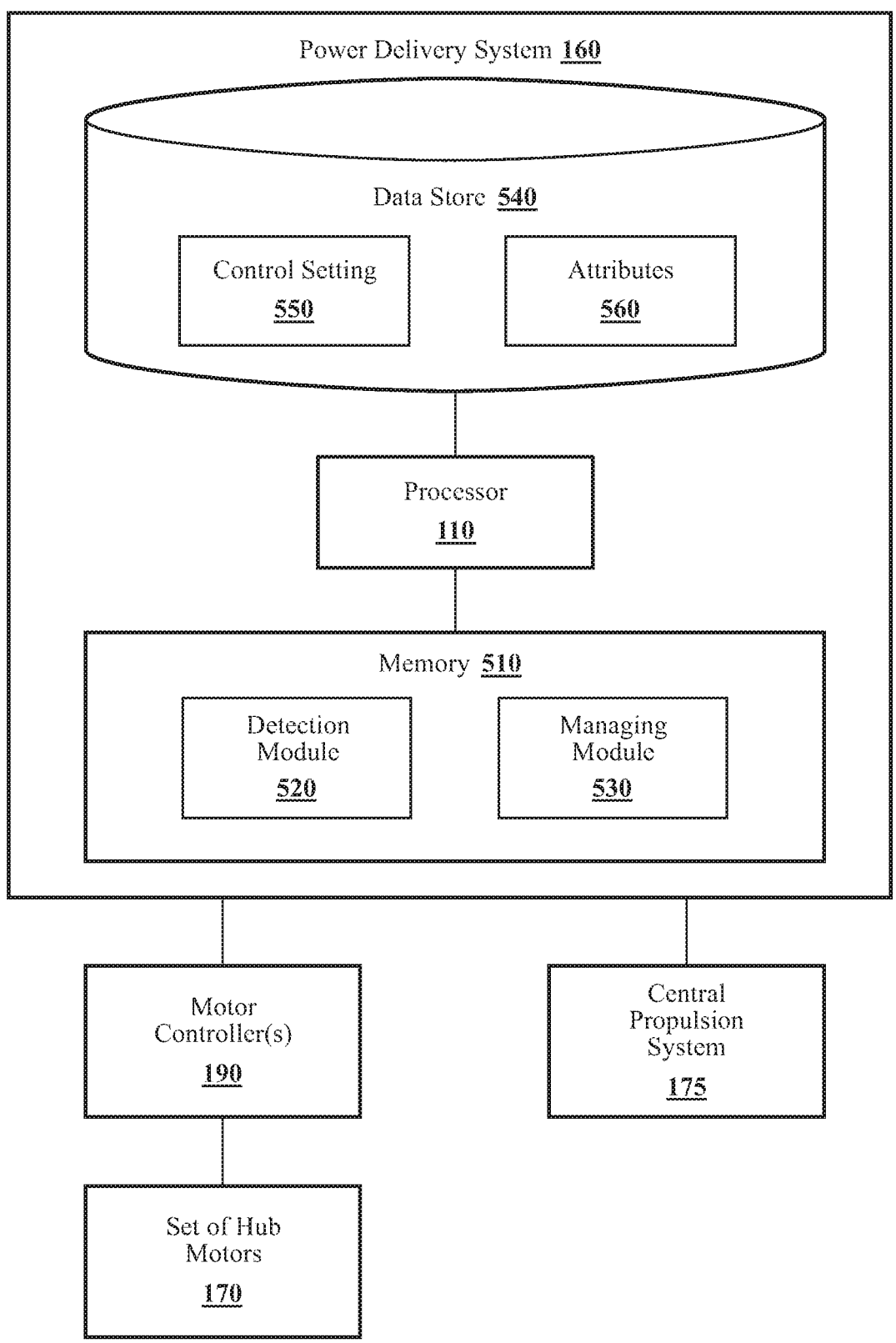
FIG. 5 illustrates one embodiment of a power delivery system that is associated with improving propulsion of a vehicle.

With reference to FIG. 5, one embodiment of the power delivery system 160 of FIG. 1 is further illustrated. The power delivery system 160 is shown as including a processor 110 from the vehicle 100 of FIG. 1. Accordingly, the processor 110 may be a part of the power delivery system 160, the power delivery system 160 may include a separate processor from the processor 110 of the vehicle 100, or the power delivery system 160 may access the processor 110 through a data bus or another communication path. In one embodiment, the power delivery system 160 includes a memory 510 that stores a detection module 520 and a managing module 530. The memory 510 is a random-access memory (RAM), read-only memory (ROM), a hard-disk drive, a flash memory, or other suitable memory for storing the modules 520 and 530. The modules 520 and 530 are, for example, computer-readable instructions that when executed by the processor 110 cause the processor 110 to perform the various functions disclosed herein.

With continued reference to FIG. 5, in one embodiment, the power delivery system 160 includes a data store 540. The data store 540 is, in one embodiment, an electronic data structure (e.g., a database) for storing information. For example, in one approach, the data store 540 is a database that is stored in the memory 510 or another suitable medium, and that is configured with routines that can be executed by the processor 110 for analyzing stored data, providing stored data, organizing stored data, and so on. In either case, in one embodiment, the data store 540 stores data used by the modules 520 and 530 in executing various functions. In one embodiment, the data store 540 includes a control setting 550 and attributes 560 of the hub motor 170' along with, for example, other information that is used by the modules 520 and 530.

Accordingly, in one embodiment, the detection module 520 generally includes instructions that function to control the processor 110 to detect the vehicle configuration. The vehicle configuration, in one embodiment, is associated with an arrangement of the set of hub motors 170 that are attached and/or detached to/from the driven wheels 204, 304, 404 of the vehicle 100 by the vehicle user. In one arrangement, the detection module 520 receives one or more motor signals from known driven wheel locations on the vehicle 100. The motor signals include, in one aspect, unique identifiers of the set of hub motors 170 associated with the known driven wheel locations. Specifically, in one or more configurations, the cylindrical rotors 206 and the cylindrical stators 208 of the set of hub motors 170 include unique identifiers (e.g., a serial number, a unique code, etc.) that distinctively identifies the cylindrical rotor 206 and the cylindrical stator 208. For example, the unique identifier may be digital data stored in a memory of the cylindrical rotor 206 and cylindrical stator 208.

The detection module 520, in one embodiment, receives the motor signals from the motor controllers 190 and/or the cylindrical rotors 206 and cylindrical stators 208, e.g., at a defined frequency, upon vehicle start-up, when the cylindrical stator 208 receives power, or according to another timing constraint for checking the configuration of the driven wheels. As set forth below, the motor signals are associated with the known driven wheel locations (i.e., defined locations for receiving hub motors). The detection module 520 may compare the unique identifier received in the past with the current unique identifier to determine, i.e., detect, an occurrence of a change in the vehicle configuration. By way of example, the detection module 520 uses the unique identifiers to discern whether the cylindrical rotor 206 and/or the cylindrical stator 208 are detached, serviced, and reattached to the same driven wheel location on the vehicle 100. In this case, the detection module 520 receives the same unique identifier from the same location, which would not be considered a change in the vehicle configuration.

The detection module 520, in one embodiment, loads the control setting 550 according to the arrangement of the set of hub motors 170 as detected. Loading the control setting 550 includes subsequently storing the control setting 550 in the data store 540, control registers, or other memory location(s). The control setting 550 indicates whether the vehicle configuration is a series configuration or a parallel configuration. The series configuration and the parallel configuration further indicate a power source for the driven wheels 204. The power source is one or more motors of the set of hub motors 170 and the central propulsion system 175. The series configuration indicates that the power source for the driven wheel 404 is the central propulsion system 175. For example, the detection module 520 detects a change in the vehicle configuration when the vehicle user detaches the set of hub motors 170 from the driven wheels 204, 304, thus leaving the central propulsion system 175 as the sole power source for the driven wheel 404. The parallel configuration indicates that the power source for the driven wheels 204, 304 is the set of hub motors 170 and the central propulsion system 175 working in parallel on the driven wheels 204, 304. As set forth below, the parallel configuration has various operating modes depending upon whether the power delivery system 160 energizes the set of hub motors 170, energizes the central propulsion system 175, or energizes both the set of hub motors 170 and the central propulsion system 175.

Additionally, in one arrangement, the detection module 520, in response to loading the control setting 550 to the parallel configuration, identifies a location of the one or more hub motors 170' of the set of hub motors 170 relative to the vehicle 100. For example, the detection module 520 gathers the unique identifiers of the motor signals and identifies a number of the hub motors 170' on the driven wheels 204, 304. In other words, the detection module 520 identifies the hub motor 170' that is attached and the hub motor 170' that was detached. Moreover, since the motor signals are associated with known driven wheel locations, the detection module 520 identifies where the hub motors 170' are attached/detached relative to the vehicle 100, as well as swap conditions, i.e., when the same hub motor moved from one location to another location.

In one embodiment, the detection module 520 may receive the motor signals from the motor controllers 190 via a wired or a wireless connection to identify the location of the one or more hub motors 170'. For example, the detection module 520 may include electrical ports configured to receive the motor signals, via the wired or wireless connection, directly from the motor controllers 190 located near specific driven wheel locations, e.g., front-right wheel, front-left wheel, rear-right wheel, rear-left wheel, etc. In some instances, the power delivery system 160 may assign the specific driven wheel location to the electrical ports of the detection module 520. Alternatively, the detection module 520 may receive the motor signals directly from the set of hub motors 170. For example, the detection module 520 receives the motor signals from the cylindrical stators 208 and/or the cylindrical rotors 206 via the wired or wireless connection in a similar manner.

Furthermore, the detection module 520, in one embodiment, identifies the attributes 560 of the hub motors 170' of the set of hub motor 170 coupled with, i.e., attached to, the driven wheels 204, 304 in response to loading the control setting 550 to the parallel configuration. In one arrangement, the unique identifier includes the attributes 560 of the hub motor 170', and the detection module 520 parses the unique identifier to retrieve the attributes 560. The attributes 560 indicate characteristics of the hub motor 170', the cylindrical rotor 206, the cylindrical stator 208, and the mounting configuration of the cylindrical stator 208, as described further below. For example, the attributes 560 may include a rated voltage and/or a rated current of the hub motor 170', etc. The detection module 520, in one arrangement, stores the attributes 560 in the data store 540 or the memory 510 for further use by the managing module 530.

Additionally, the detection module 520, in one arrangement, includes instructions to determine properties of the hub motors 170' according to the identified attributes 560 and the location of the set of hub motors 170. In one arrangement, the detection module 520 calculates at least a power rating that defines maximum input power delivered to the hub motors 170' according to the attributes 560 and relative locations of the hub motors 170' on the vehicle 100. For example, the detection module 520, in one embodiment, calculates the power rating in response to loading the control setting 550 to the parallel configuration.

Moreover, the properties of the one or more hub motors 170' may, in one approach, be derated. By way of example, when the detection module 520 detects a change in the vehicle configuration due to attaching the set of hub motors 170 to the driven wheels 204 (e.g., on the rear axle), the detection module 520 loads the control setting 550 to the parallel configuration. As a result, the detection module 520 identifies the attributes of the hub motors 170' of the set of hub motors 170 and identifies the location of the hub motors 170' relative to the vehicle 100. For this example, the detection module 520 determines that the hub motor 170' located at the rear-right wheel location has a different mechanical property that corresponds to a lower full-load torque ability than the hub motors 170' located at the rear-left wheel location. In this case, the detection module 520 may derate the hub motor 170' located at the rear-left wheel location so that the associated full-load torque output does not interfere with the hub motor 170' located at the rear-right wheel location. In other words, derating is used by the managing module 530 to prevent applying excessive torque to the hub motor 170' on the rear-right wheel, as discussed further below.

The managing module 530, in one or more embodiments, generally includes instructions that function to control the processor 110 to manage the power delivery to the set of hub motors 170 and the central propulsion system 175 to propel the vehicle 100 according to the control setting 550. For example, the managing module 530, when in the series configuration and in response to a power demand indicated by an electronic control input (e.g., from a throttle system 146 (FIG. 1) of the vehicle 100), operates the central propulsion system 175 at a power level that satisfies the power demand to provide propulsion according to the central propulsion system 175. In other words, the managing module 530, when in the series configuration, operates the central propulsion system 175, i.e., the at least one of the ICE and the electric motor, at the power level that satisfies the power demand indicated by the electronic control input to provide propulsion to the vehicle 100.

Furthermore, for example, the managing module 530, when in the parallel configuration and in response to the power demand indicated by the electronic control input, operates the set of hub motors 170 and the central propulsion system 175 at the power level that satisfies the power demand to provide propulsion to the vehicle 100. The managing module 530 provides the appropriate power level in the parallel configuration utilizing the various operating modes, which are defined by how the set of hub motors 170 and the central propulsion system 175 are energized and/or de-energized, as defined in detail below.

Additionally, the managing module 530, in one arrangement, utilizes the identified locations of the hub motors 170' on the vehicle 100 and the associated characteristics identified from the attributes 560 to manage the power delivery to the set of hub motors 170. In one approach, the managing module 530 independently manages the electrical power to provide distinct levels of the electrical power to separate ones of the hub motors 170'. In other words, the managing module 530 may independently manage the power delivery to each of the hub motors 170' of the set of hub motors 170.

Figure 6:
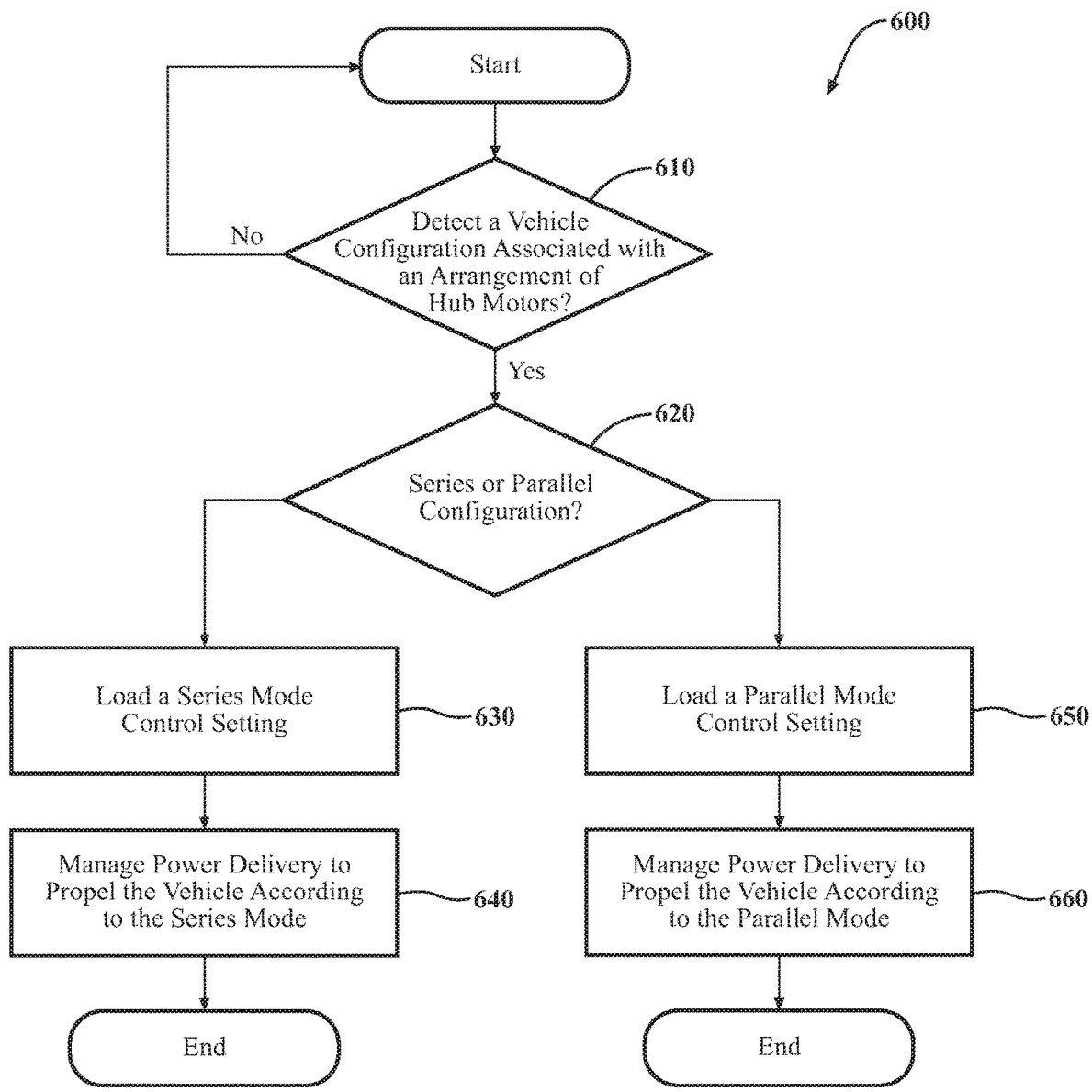
FIG. 6 illustrates one embodiment of a method that is associated with improving propulsion of a vehicle.
Figure 7A:
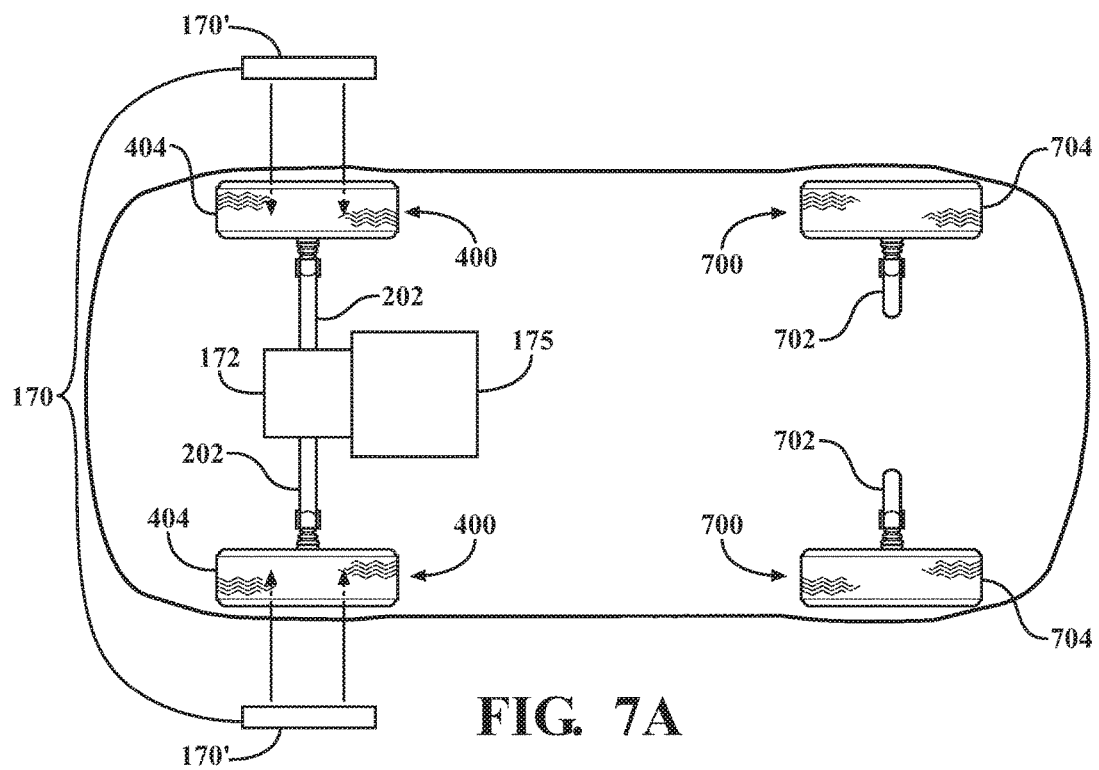
FIG. 7A is a schematic bottom view of an embodiment of a vehicle where a set of hub motors are attached to driven wheels of the vehicle.
Figure 7B:
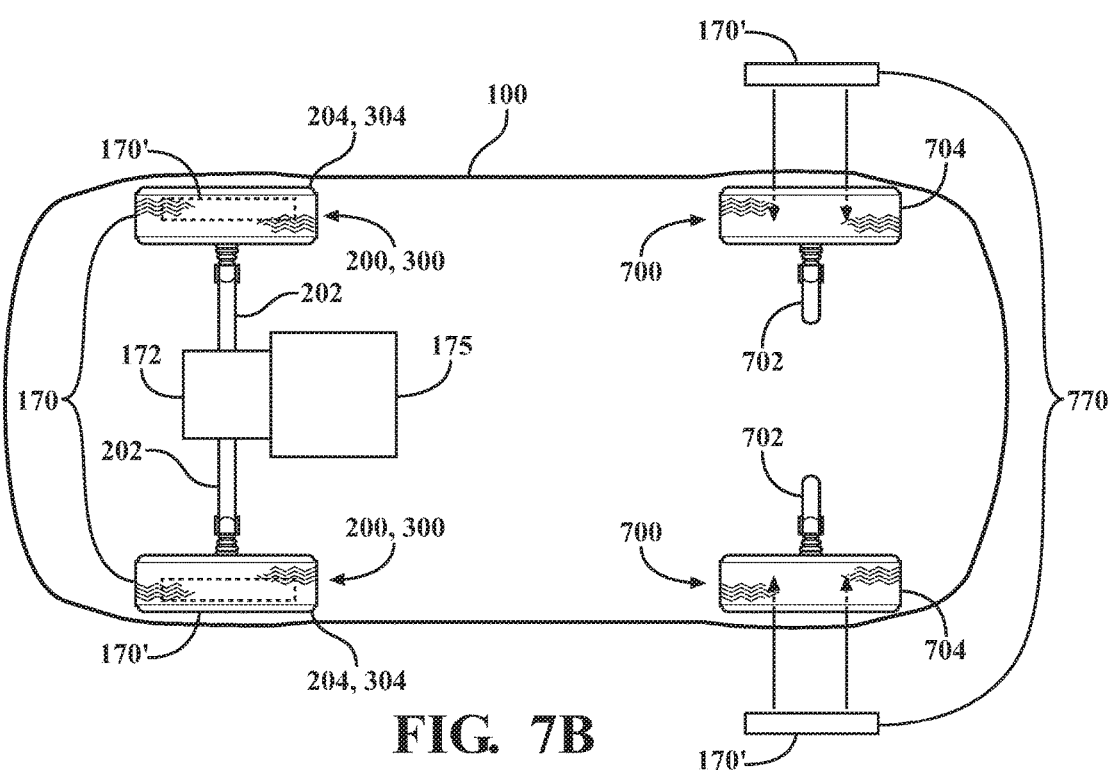
FIG. 7B is a schematic bottom view of an embodiment of a vehicle where an additional set of hub motors are attached to non-driven wheels of the vehicle.
Figure 8:
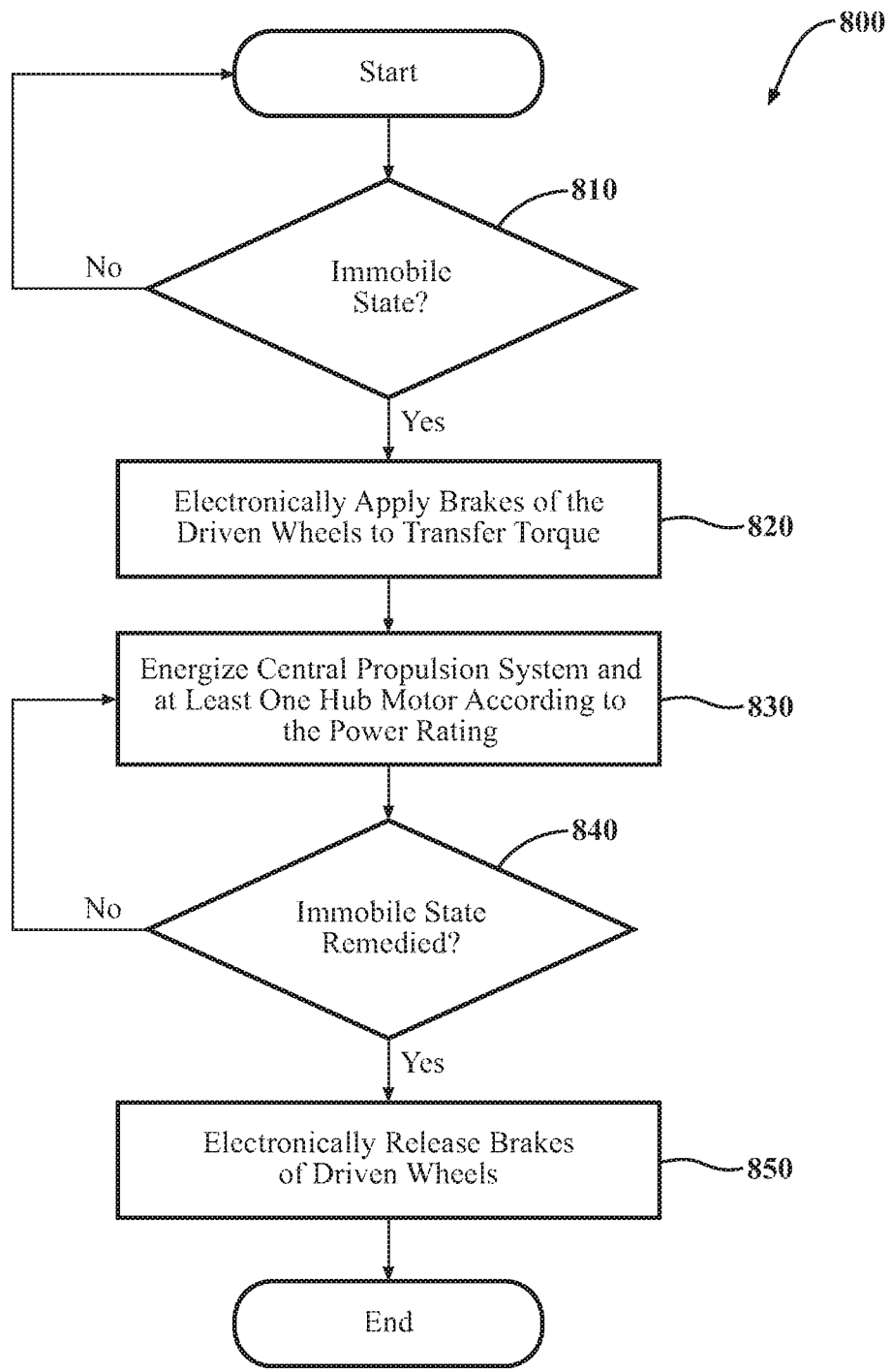
FIG. 8 illustrates one embodiment of a method that is associated with managing electrical power delivery to a set of hub motors and a central propulsion system during an immobile state of a vehicle.
Figure 9:
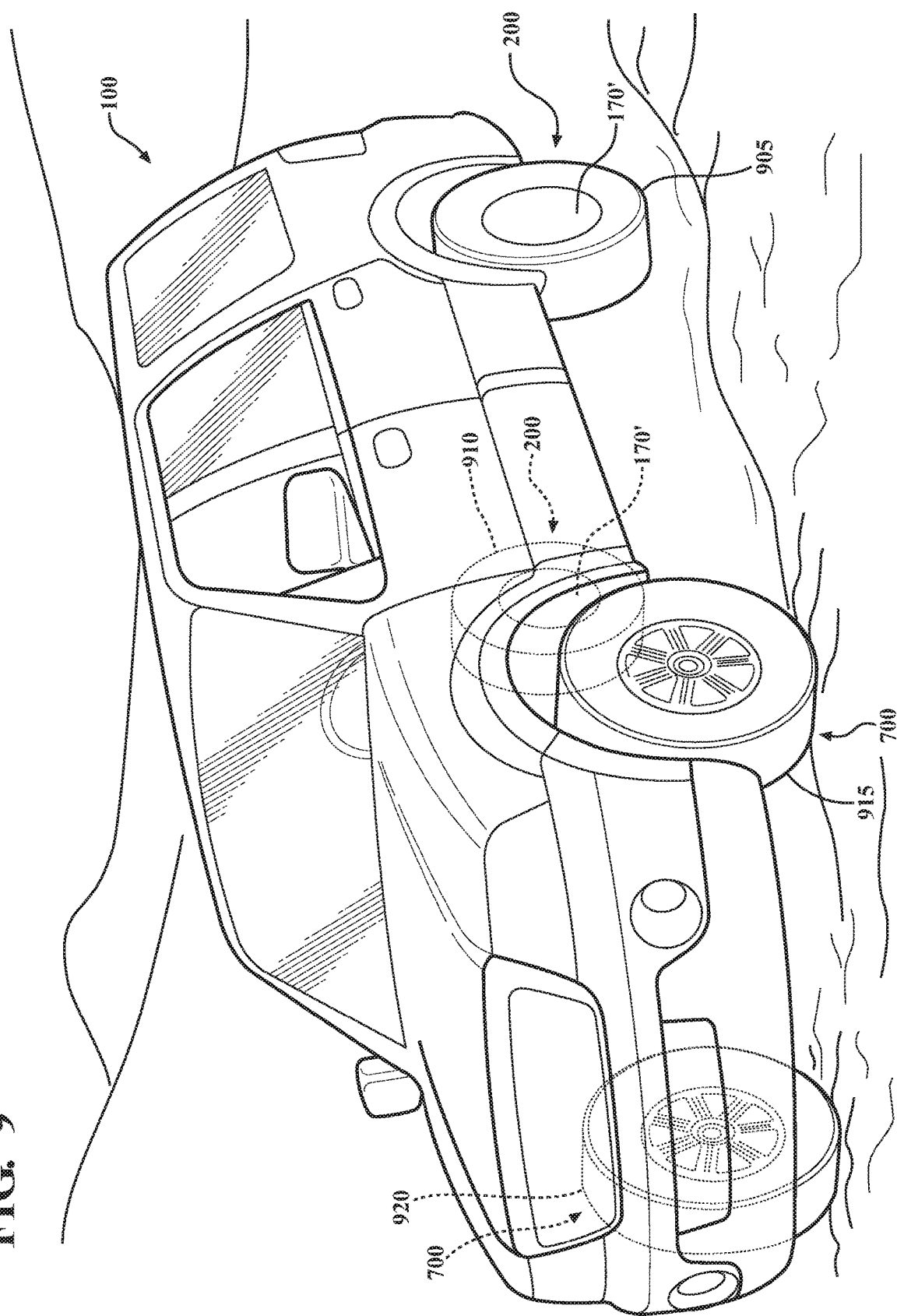
FIG. 9 illustrates one example of a vehicle in an immobile state.

Additional aspects of managing power delivery to the hub motors 170 will be discussed in relation to FIGS. 6-9. FIG. 6 illustrates a flowchart of a method 600 that is associated with improving propulsion of the vehicle 100 by managing power delivery to the set of hub motors 170 and the central propulsion system 175 in response to detecting a vehicle configuration associated with an arrangement the set of hub motors 170, as shown in FIGS. 7A-7B. FIGS. 7A-7B also introduce a non-driven wheel system 700 of the vehicle 100. As used herein, the term "non-driven wheel" refers to a wheel of the vehicle 100 that is not coupled to the central propulsion system 175 but may or may not be driven by the hub motor 170' whereas "driven wheel" generally refers to a wheel that is coupled to the propulsion system 175 and may also include a hub motor. Due to the similarities of the non-driven wheel system 700 and the wheel systems 200, 300, 400, as set forth below, the method 600, in one embodiment, also detects a change in the vehicle configuration associated with an additional set of hub motors 770 and manages the power delivery to the set of hub motors 170, the additional set of hub motors 770, and the central propulsion system 175 to propel the vehicle according to the control setting 550. FIG. 8 illustrates a flowchart of a method 800 that is associated with managing the brakes 272 of the wheel systems 200, 300, 400, and the power delivery to the set of hub motors 170 during an immobile state of the vehicle 100, as shown in FIG. 9. Methods 600 and 800 will be discussed from the perspective of the power delivery system 160 of FIGS. 1-5. While methods 600 and 800 are discussed in combination with the power delivery system 160, it should be appreciated that the methods 600 and 800 are not limited to being implemented within the power delivery system 160, but is instead are examples of systems that may implement the methods 600 and 800.

The method 600 and FIGS. 7A-7B demonstrate the flexibility of the power delivery system 160 in improving propulsion of the vehicle 100 by allowing the vehicle user to supplement the propulsion for an intended purpose. For example, the vehicle user may want to enhance vehicle performance (e.g., increase low-speed torque) in an off-road environment by attaching the set of hub motors 170 to the rotatable axles 202 (e.g., the rear axles) of the vehicle 100, as illustrated in FIG. 7A. The outward-facing location of the hub motor sub-components (i.e., the cylindrical rotor 206 and the cylindrical stator 208) allows the vehicle user to attach the hub motors 170' to the rear-left and the rear-right wheel locations, as shown in FIG. 7A. It should be appreciated that other vehicle configurations are possible depending upon the specific needs of the vehicle user. For example, the vehicle user may detach the set of hub motors 170 from the rear axles when the off-roading activities are complete, thus changing the vehicle configuration, i.e., back to the serial configuration, for daily commuting. The vehicle user may want to attach the additional set of hub motors 770 onto the one or more non-driven wheel systems 700 of the vehicle 100, as shown in FIG. 7B, to further enhance vehicle performance.

As another example, the vehicle user may upgrade the set of hub motors 170 or the additional set of hub motors 770 from an axial flux type to a radial flux type to provide more high-speed torque for racing. Other vehicle configurations are possible, such as replacing the set of hub motors 170 with a more powerful set when the vehicle 100 is immobile, attaching/detaching hub motors 170' to vehicles with supplemental axles having the wheel systems 200, 300, 400, and the non-driven wheel systems 700, etc. The reconfiguration scenarios mentioned may also provide sales, leasing, service, or other monetization opportunities, e.g., selling a base rear-wheel drive (RWD) vehicle having an internal combustion engine (i.e., a central propulsion system) with the possibility of later upgrading the vehicle 100 with the set of hub motors 170. In this way, the configuration of the mounting components of the driven wheels 204, 304, 404 permits different hub motors to be selectively attached, thereby improving configurability of the vehicle 100 and expanding the usage scenarios for the vehicle 100.

Referring to FIGS. 7A-7B, for example, the non-driven wheel system 700 of the vehicle 100 includes a non-rotatable axle 702 and a non-driven wheel 704. The non-rotatable axle 702 rigidly couples to the vehicle 100, and the non-driven wheel 704 rotatably couples to the non-rotatable axle 702. The hub motors 170' of the additional set of hub motors 770 are structured to be selectively attached to the non-driven wheels 704 without removing the non-driven wheels 704 from the vehicle 100 in the same manner as the hub motors 170' of the set of hub motors 170. An embodiment that includes non-rotatable axles rigidly coupled to a vehicle, wheels rotatably coupled to the non-rotatable axles, and hub motors structured to be selectively attached to the wheels of the vehicle without removing the wheel from the vehicle is disclosed in U.S. patent application Ser. No. 16/588,198, which is hereby incorporated by reference in its entirety.

Accordingly, at 610, the detection module 520 monitors for a change in the vehicle configuration. For example, the detection module 520 receives one or more motor signals from either the motor controllers 190 associated with the specific hub motors 170' and/or directly from the hub motors 170'. The motor signals may be broadcast, e.g., at a defined frequency, upon vehicle start-up, when the cylindrical stator 208 receives power, etc. Furthermore, the detection module 520 determines that the one or more motor signals from either the motor controllers 190 and/or directly from the hub motors 170' stop broadcasting, thus signifying that one or more hub motors 170' were recently detached.

In one embodiment, the detection module 520 compares the unique identifiers obtained from a past broadcast to a current broadcast to determine a difference in a configuration of the cylindrical rotors 206 and the cylindrical stators 208 currently attached to the driven wheels 204, 304 and the non-driven wheels 704 having the hub motors 170' attached. A change in the vehicle configuration may be detected when the detection module 520 determines that the unique identifiers are different between broadcasts. The detection module 520 continues to monitor the motor signals in efforts to detect a change in the vehicle configuration associated with the arrangement of the hub motors 170' on both the driven wheels 204, 304, 404, and the non-driven wheels 704.

At 620, the detection module 520, in one embodiment, determines the power source for the driven wheels 204 in response to detecting a change in the vehicle configuration. For example, if the motor signals were broadcasting and suddenly stopped broadcasting for a defined stop-time, the detection module 520 assumes that a vehicle configuration change occurred and that the set of hub motors 170 were detached. In this case, the power source for the vehicle 100 would be the central propulsion system 175, which indicates a series configuration. It should be noted that the determination of the power source is concerned with the driven wheels 204, 304, 404, and is independent of whether the hub motors 170' are attached or detached to/from the non-driven wheels 704, as will become clear with further discussions.

Alternatively, if the motor signals suddenly begin to broadcast after a defined off-time, or if the detection module 520 determines a change in a number of received motor signals from the hub motors 170' that are attached to the driven wheels 204, 304, the detection module 520, in one embodiment, assumes that a vehicle configuration change occurred. In this case, the power source for the vehicle 100 would be both the set of hub motors 170 and the central propulsion system 175, which indicates a parallel configuration. The detection module 520 may utilize the unique identifier of the motor signal to detect a scenario where the vehicle 100 is not commanded to move, but the same hub motor 170' was detached and subsequently attached to the same driven wheel 204, 304, e.g., the vehicle user fixed a flat tire. In this case, the detection module 520 would not recognize a change in the vehicle configuration. It should be noted that one or more hub motors 170' attached to the driven wheels 204, 304 indicates the parallel configuration.

At 630, the detection module 520 determines that the vehicle configuration is the serial configuration, for example, based on the behavior of the motor signals. That is, the power source for the driven wheels 404 is the central propulsion system 175. The detection module 520, in one arrangement, loads the control setting 550 to the serial configuration. The detection module 520 also stores the serial configuration as the control setting 550 in the data store 540 so that the managing module 530 can verify the vehicle configuration.

At 640, the managing module 530, in one arrangement, manages the power delivery to the central propulsion system 175, according to the control setting 550, which in this case is the series configuration. The series configuration is concerned with how the driven wheels 404 are driven. However, the managing module 530 also manages the power delivery to the additional set of hub motors 770 when they are attached to the non-driven wheels 704, The managing module 530 accounts for the presence of the additional set of hub motors 770 when determining the power level that satisfies the power demand, which is described below after the parallel configuration discussions.

Accordingly, the managing module 530 operates the central propulsion system 175 at the power level that satisfies the power demand to provide propulsion to the vehicle 100 in response to the power demand indicated by the electronic control input. The managing module 530 receives the electronic control input from a suitable vehicle system 140 (FIG. 1) of the vehicle 100. For example, the throttle system 146 of the vehicle system 140 determines the power demand in response to the vehicle user depressing the accelerator pedal and generates the electronic control input received by the managing module 530. Alternatively, in one embodiment, the managing module 530 receives various electronic control inputs from, for example, various vehicle systems 140, vehicle sensor(s) 121, environmental sensor(s) 122, sensor data 119, etc., as illustrated in FIG. 1, and calculates the power demand and the resulting power level to apply to the central propulsion system 175.

Depending on the configuration of the central propulsion system 175, the managing module 530, for example, determines the power level that satisfies the power demand and delivers the appropriate amount of fossil fuel (e.g., from fuel injectors of the ICE) and/or electrical power (e.g., from the vehicle battery 180) to the ICE and electric motor, respectively. The managing module 530, in one embodiment, controls power-split devices to manage mechanical power delivery from the ICE and the electrical power delivery from the electric motor for parallel hybrid configurations, as is known in the art. The managing module 530 may manage any suitable hybrid powertrain configurations, e.g., parallel hybrid systems, series hybrid systems, power-split hybrid systems, TTR hybrid systems, etc.

At 650, the detection module 520 has determined the vehicle configuration is the parallel configuration, for example, based on the behavior of the motor signals. That is, the detection module 520 detected a vehicle configuration that is associated with a change in the arrangement of the set of hub motors 170. The detection module 520, in one arrangement, loads the control setting 550 to the parallel configuration to indicate that the power source for the driven wheels 204, 304 is the set of hub motors 170 and the central propulsion system. 175. The detection module 520 also stores the parallel configuration as the control setting 550 in the data store 540 so that the managing module 530 can verify the vehicle configuration.

At 660, the managing module 530, in one arrangement, manages the power delivery to the set of hub motors 170 and the central propulsion system 175 according to the control setting 550, i.e., the parallel configuration. The parallel configuration indicates that the power source for the driven wheels 204, 304 is one or more of a motor of the set of hub motors 170 and the central propulsion system 175. In other words, the power source for the driven wheels 204, 304 may be either the set of hub motors 170, the central propulsion system 175 or both depending on the operating mode. The parallel configuration is concerned with how the driven wheels 204, 304 are driven. However, the managing module 530 also accounts for and manages the power delivery to the additional set of hub motors 770 when they are attached to the non-driven wheels 704 when determining the power level that satisfies the power demand. The various operating modes used for driving the driven wheels 204, 304 will be discussed first, followed by a discussion of how the managing module 530 manages electrical power delivery to the hub motors 170' and the additional set of hub motors 770 when attached.

As set forth above, the managing module 530 operates the set of hub motors 170 and the central propulsion system 175 at the power level that satisfies the power demand to provide propulsion to the vehicle 100 in response to the power demand indicated by the electronic control input. The managing module 530 receives one or more electronic control inputs from the suitable vehicle system 140, as set forth above. For example, the managing module 530 satisfies the power demand to provide propulsion to the vehicle 100 by driving the driven wheels 204, 304 using one of three operating modes: an electric mode, a conventional mode, and a combined mode. The power delivery system 160, in one or more embodiments, utilizes the three modes according to an algorithmic powertrain control strategy.

In the electric mode, the managing module 530, in one embodiment, de-energizes, i.e., deactivates, the central propulsion system 175, and energizes the set of hub motors 170, i.e., utilizes the set of hub motors 170 exclusively, to propel the vehicle 100. The managing module 530 actuates the one or more drivetrain clutches 268 via the drivetrain clutch bus 270 to lock the rotatable axles 202 to prevent rotation. Additionally, the managing module 530 disengages the one or more wheel clutches 264 via the wheel clutch bus 266, allowing relative rotation between the wheel hub 238 and the rotatable axle 202. The managing module 530 operates the set of hub motors 170 at a power level that satisfies the power demand and in accordance with the power rating to provide propulsion to the vehicle 100, as set forth below. For example, the power delivery system 160 uses the electric mode as a control strategy to conserve fossil fuel, e.g., during low torque demand conditions (i.e., a nonaggressive vehicle start-up at a traffic light), highway cruise conditions, regenerative braking, etc.

In the conventional mode, the managing module 530, in one embodiment, de-energizes the set of hub motors 170 and energizes the central propulsion system 175 to propel the vehicle 100. The managing module 530 disengages the one or more drivetrain clutches 268, which allows the rotatable axles 202 to rotate according to the differential. The managing module 530 actuates the one or more wheel clutches 264 via the wheel clutch bus 266 to "lock" the respective wheel hub 238 to the rotatable axle 202, i.e., prevent relative rotation in both directions. The managing module 530 operates the central propulsion system 175 at a power level that satisfies the power demand, as set forth above. For example, the power delivery system 160 uses the conventional mode as a control strategy to charge the vehicle battery 180 during a low state of charge (SOC) condition.

In the combination mode, the managing module 530, in one embodiment, energizes both the set of hub motors 170 in accordance with the power rating and the central propulsion system 175 at a power level that satisfies the power demand to propel the vehicle 100. The managing module 530 disengages the one or more drivetrain clutches 268 and actuates the one or more wheel clutches 264 to allow relative rotation of the wheel hub 238 and the rotatable axle 202 in one direction, i.e., a forward vehicle direction. The "one-way" operation of the wheel clutch 264 allows the set of hub motors 170 to provide an additive torque to the driven wheels 204, 304, which may cause the driven wheels 204, 304 to rotate at a faster speed than the rotatable axle 202. In situations where the additive torque is not needed during activation of the combination mode, the one-way clutch operation of the wheel clutch 264 locks the wheel hub 238 to the rotatable axle 202, which prevents the wheel hub 238 slipping with respect to the rotatable axle 202. In other words, the one-way clutch operation avoids energizing the set of hub motors 170 to electrically couple the wheel hub 238 to the rotatable axle 202, which conserves electrical energy. For example, the power delivery system 160 uses the combination mode as a control strategy for high power demand situations, e.g., an aggressive vehicle start-up from a traffic light, towing, passing, etc.

In one arrangement, the managing module 530, in the combination mode, provides an opposing torque to the rotatable axle 202 relative to the wheel hub 238 for electronic braking operations. For example, the managing module 530 uses the set of hub motors 170 to either electronically brake the vehicle 100 without the use of the brake 272, or electronically supplement the mechanical operation of the brake 272 to slow the vehicle 100 down. In this case, the managing module 530 dynamically disengages the one or more wheel clutches 264 while operating the set of hub motors 170 to provide an appropriate opposing torque to the rotatable axle 202 relative to the wheel hub 238 for slowing down the vehicle 100.

In one or more embodiments, the detection module 520 determines the properties of the hub motors 170 associated with the arrangement of the hub motors 170' of the set of hub motors 170 and of the additional set of hub motors 770. The detection module 520, in one arrangement, parses the unique identifiers to retrieve the attributes 560 of the hub motors 170', which are used to determine the properties of the hub motors 170'. As previously indicated, the detection module 520, in one arrangement, calculates at least the power rating of the hub motor 170' that defines the maximum input power deliverable to the hub motor 170' from the motor controller 190. For example, the maximum input power is a continuous power deliverable to the hub motor 170' without overheating the hub motor 170'. The power rating may depend at least upon such attributes 560 as a rated voltage, a rated current, a motor efficiency, full-load speed, an insulation rating, i.e., a temperature rating of stator windings, rotor and stator properties, and a heat sink configuration. The rated voltage is a voltage at which the hub motor 170' is designed to operate. The rated current is a continuous current at the rated voltage that is deliverable to the hub motor 170' without overheating the stator windings. The motor efficiency is a ratio of the output power to the input power of the hub motor 170' and may account for motor losses. The full-load speed is the speed at which the rated full-load torque is delivered. It should be noted that the rated current, in most cases, is specified at a maximum ambient temperature, e.g., 40 C, which implies that the power rating is dependent upon the ambient temperature. Also, the detection module 520 may receive the ambient temperature from the one or more environment sensors 122 of a sensor system 120 (FIG. 1).

In one embodiment, the hub motor 170' includes at least one temperature sensor that monitors a temperature of the stator windings. For example, the temperature sensor wiring may be included in electrical interface 258 of the hub motor 170', as set forth above. The stator windings are typically the highest temperature sub-components of the hub motor 170'. The insulation rating determines the absolute maximum temperature of the windings, beyond which damage may occur. The power rating affects the temperature of the stator windings, e.g., a higher power rating equates to more power injected into the hub motor 170', which raises the temperature of the stator windings. Therefore, the detection module 520, in one embodiment, dynamically adjusts the power rating as a function of the ambient temperature around the hub motor 170'. For example, when the ambient temperature exceeds 40 C, the detection module 520 may reduce the power rating accordingly so as not to exceed the insulation rating.

In one embodiment, the stator spacer 236 is a sub-component of the cylindrical stator 208. In this case, the stator spacer 236 may be rigidly attached to the cylindrical stator 208, and the unique identifier of the cylindrical stator 208 may store the corresponding heat sink configuration, i.e., thermal properties of the cylindrical stator 208 and the stator spacer 236. Thermal properties of a wheel junction defined from the stator spacer 236 to the ambient air may be known and stored in the data store 540 or the memory 510. Alternatively, the detection module 520 may prompt the vehicle user for the type of wheel via an input system 130 of the vehicle 100, e.g., a touch screen. For example, the vehicle user, in response to the prompt, may enter a serial number of the driven wheel 204, the wheel radius, the wheel hub material, etc., and the detection module 520 may calculate the thermal properties of the wheel junction. In either case, the detection module 520 may determine a thermal time constant of a heat sink of the wheel system that includes the thermal properties of the cylindrical stator 208, the stator spacer 236, and the wheel junction. The thermal time constant may be used to determine the characteristics of a temperature rise of the stator windings to further enhance the calculation of the power rating by the detection module 520.

Additionally, the detection module 520 may derate the properties of one or more hub motors 170' depending on the wheel configuration, as previously indicated. The detection module 520, in one arrangement, may determine mechanical properties of the hub motors 170'. For example, the detection module 520 may calculate the rated full-load torque of all the attached hub motors 170' from the attributes 560. The detection module 520 may determine that a torque property (e.g., the full-load torque) of the hub motors 170' on the front axles, the rear axles, and/or the supplemental axles are mismatched. In this case, the detection module 520 may derate the one or more of the hub motors 170' to balance the torque delivery capabilities of the hub motors 170' on the respective axles. For example, the detection module 520 may derate the hub motors 170' by reducing the electrical power delivered to the appropriate hub motors 170' in order to stabilize the torque delivered to the respective axles.

Furthermore, the managing module 530, in one embodiment, manages the power delivery to the additional set of hub motors 770 when attached to the non-driven wheels 704. That is, when the managing module 530 receives an indication of a change in the vehicle configuration associated with the arrangement of the additional set of hub motors 770, for example, from the detection module 520, the managing module 530 manages the power delivery to the set of hub motors 170, the additional set of hub motors 770, and the central propulsion system 175.

In a similar manner as described above for the set of hub motors 170, the detection module 520, in one embodiment, identifies the attributes and the locations of the hub motors 170' of the additional set of hub motors 770 relative to the vehicle 100. However, loading the control setting 550 to the parallel configuration is not a prerequisite for the identification of the additional set of hub motors 770. The managing module 530 takes into account whether the additional set of hub motors 770 are attached/detached to the vehicle 100 when operating the set of hub motors 170, the additional set of hub motors 770 and the central propulsion system 175 at a power level that satisfies the power demand according to the control setting 550.

By way of an example, the vehicle user attaches the set of hub motors 170 to the driven wheels 204 and the additional set of hub motors 770 to the non-driven wheels 704, e.g., for towing a heavy load. The detection module 520 detects the vehicle configuration, loads the control setting 550 to the parallel configuration, identifies the attributes and the locations of all hub motors 170' on the vehicle 100, i.e., from both the set of hub motors 170 and the additional set of hub motors 770, and calculates the power ratings and applicable deratings for the hub motors 170'. The power demand from the vehicle user depressing the accelerator produces a power level, (i.e., as determined by the managing module 530) that dictates the application of the combination mode for the driven wheels 204 and the use of the additional set of hub motors 770. The managing module 530 modulates the electrical power delivery to all the hub motors 170' according to the power level and in accordance with the power rating. As another example, if the additional set of hub motors 770 are attached to the front axles, the managing module 530 may de-energize the set of hub motors 170 and the central propulsion system 175, and propel the vehicle 100 by the additional set of hub motors 770, e.g., for front-wheel drive, electric-only operation of the vehicle 100.

The method 800 is an example of how the power delivery system 160 improves propulsion of the vehicle 100 during an immobile state of the vehicle 100 by managing the brakes 272 and the power delivery to the set of hub motors 170. FIG. 9 illustrates the vehicle 100 in an immobile state where one wheel of the vehicle 100 is not in contact with the roadway. The vehicle 100 in FIG. 9 includes a RWD configuration (i.e., the hub motors 170' of the set of hub motors 170 and the central propulsion system 175 (not shown) are coupled to driven wheels 905 and 910), and two non-driven wheels 915 and 920 are without the additional set of hub motors 770. In the scenario of FIG. 9, the driven wheel 910 has diminished driving torque ability due to the driven wheel 905 not being in contact with the roadway.

At 810, the detection module 520 determines an immobile state of the vehicle 100. For example, the one or more vehicle systems 140 of the vehicle 100 (e.g., a traction control system, an anti-lock brake system, etc.) determine that at least one wheel is slipping while the vehicle 100 is not moving along the roadway. In this case, the vehicle system 140 may transmit an immobile message onto a vehicle bus (e.g., a vehicle controller area network (CAN) bus) indicating that the vehicle 100 is in an immobile state. The detection module 520, in response to the immobile message, may notify the managing module 530. Alternatively, the detection module 520 may, for example, monitor wheel speeds and a vehicle speed from the vehicle CAN bus to determine the immobile state and notify the managing module 530 accordingly. In either case, the detection module 520, when notifying the managing module 530, includes which wheels of the vehicle 100 that are not in contact with the roadway.

At 820, the managing module 530 applies the brake 272 of the wheel system 200 that corresponds to the driven wheel 905, i.e., the wheel not in contact with the roadway, by actuating the brake actuator 286 via the brake power bus 288. For example, applying the brake 272 to the driven wheel 905 will direct, i.e., transfer, all the torque from the central propulsion system 175 to the driven wheel 910 via the differential of the drivetrain 172.

At 830, the managing module 530 operates the central propulsion system 175 and the set of hub motors 170 at a power level that satisfies a power demand to provide propulsion to remedy the immobile state of the vehicle 100. More specifically, the managing module 530 energizes the central propulsion system 175 and energizes the hub motor 170' attached to the driven wheel 910 according to the power rating of the hub motor 170'. Therefore, by applying the brake 272 to the driven wheel 905 and managing the power delivery to the central propulsion system 175, torque from the central propulsion system 175 that was directed to the driven wheel 905 is now transferred to the driven wheel 910. Moreover, the power delivery to the set of hub motors 170 is directed only to a driven wheel that can affect the movement of the vehicle 100, i.e., to the driven wheel 910, and electrical energy is conserved by not energizing the hub motor 170' attached to the driven wheel 905.

The managing module 530, in one embodiment, manages the power delivery to the hub motor 170' according to the power rating associated with the hub motor 170' attached to the driven wheel 910. The power rating, as dynamically calculated by the detection module 520 from the attributes 560, incorporates at least the attributes of the hub motor 170', the ambient temperature, the temperature of the stator windings, the thermal time constant (i.e., heat sink properties of the wheel system 200), and any applicable derating, as set forth above. Alternatively, for the case where the arrangement of hub motors 170' includes the additional set of hub motors 770, the managing module 530, for example, manages the power delivery to additional set of hub motors 770, as well as the central propulsion system 175 and the hub motor 170' attached to the driven wheel 910 to remedy the immobile state of the vehicle 100.

At 840, the managing module 530 maintains the actuation of the brake 272 and continues to manage the power delivery to the central propulsion system 175 and the hub motor 170' attached to the driven wheel 910 until the immobile state is remedied. The detection module 520 will continue to update the power rating of the hub motor 170' for the managing module 530. For example, the managing module 530 will continue to execute block 830 until the vehicle user eliminates the power demand or the immobile state is remedied.

At 850, the managing module 530 releases the brake 272 associated with the driven wheel 905. For example, the managing module 530 will continue to manage the power delivery to the set of hub motors 170 and the central propulsion system 175 as long as there is a power demand.

It should be noted that the managing module 530 may remove electrical power from one or more of the hub motors 170' if the wheels 905-920 are not in contact with the roadway during the immobile state, or another vehicle state, to conserve energy. As yet another example, the vehicle user or an emergency responder may attach one or more hub motors 170' to driven wheels 204, 304 and/or non-driven wheels 704 while the vehicle 100 is in the immobile state. In this scenario, the detection module 520 detects a change in the vehicle configuration, which initiates the method 600 and may immediately remedy the immobile state. If the method 600 is not successful, the detection module 520 may detect an immobile state of the vehicle 100 once again, which initiates the method 800.

FIG. 1 will now be discussed in full detail as an example environment within which the system and methods disclosed herein may operate. The vehicle 100 can include the one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 540) for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby.

The term "operatively connected," as used throughout this description, can include direct or indirect connections, including connections without direct physical contact. The term selectively attachable and detachable used in reference to a component indicates that a human user or operator may choose to attach or detach the component from the structure with which it is associated or related.

The one or more data stores 115 can include sensor data (e.g., the sensor data 119). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of an external environment of the vehicle 100.

The sensor system 120 can include any suitable type of sensor. Various examples of different types of sensors will be described herein. However, it will be understood that the embodiments are not limited to the particular sensors described. The sensor system 120 can include the one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100. Moreover, the vehicle sensor(s) 121 can include sensors throughout a passenger compartment such as pressure/weight sensors in seats, seatbelt sensors, camera(s), and so on.

Alternatively, or in addition to, the sensor system 120 can include the one or more environment sensors 122 configured to acquire, and/or sense driving environment data. "Driving environment data" includes data or information about the external environment in which the vehicle 100 is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc. The one or more environment sensors 122 can be configured to detect, and/or sense the ambient temperature around the external environment of the vehicle 100.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include the input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 135. An "output system" includes any device, component, or arrangement or groups thereof that enable information/data to be presented to a vehicle passenger (e.g., a person, a vehicle passenger, a vehicle user, etc.).

The vehicle 100 can include the one or more vehicle systems 140. In one example, the vehicle 100 can include a propulsion system, a braking system 142, a traction system, a steering system 144, the throttle system 146, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The vehicle 100 can include one or more actuators 150. The actuators 150 can be any element or combination of elements operable to modify, adjust and/or alter the one or more of the vehicle systems 140 or components thereof responsive to receiving signals or other inputs from the processor(s) 110. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by the processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by the one or more processor 110. Alternatively, or in addition, the one or more data stores 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A power delivery system for improving propulsion of a vehicle, comprising:
   rotatable axles rotatably coupled to a drivetrain;
   a central propulsion system rotatably coupled to the drivetrain;
   driven wheels rotatably coupled to the rotatable axles;
   a set of hub motors structured to be selectively attached to the driven wheels without removing the driven wheels from the vehicle; and
   a drive controller including:
      one or more processors;
      a memory communicably coupled to the one or more processors and storing:
         a detection module including instructions that when executed by the one or more processors cause the one or more processors to, in response to detecting a vehicle configuration associated with an arrangement of the set of hub motors that are selectively attachable on the driven wheels, load a control setting according to the arrangement to one of a series configuration and a parallel configuration; and in response to loading the control setting to the parallel configuration, calculate at least a power rating that defines maximum input power to be delivered to the set of hub motors according to attributes and a location of the set of hub motors.

2. The power delivery system of claim 1,
   wherein the detection module including instructions to load the control setting according to the arrangement to one of the series configuration and the parallel configuration to indicate a power source for the driven wheels as one or more of a motor of the set of hub motors and the central propulsion system; and
   further comprising: a managing module including instructions that when executed by the one or more processors cause the one or more processors to manage power delivery to the set of hub motors and the central propulsion system to propel the vehicle according to the control setting.

3. The power delivery system of claim 2, wherein the managing module further includes instructions to:
   when in the series configuration and in response to a power demand indicated by an electronic control input, operate the central propulsion system at a power level that satisfies the power demand to provide the propulsion according to the central propulsion system, and
   when in the parallel configuration and in response to the power demand indicated by the electronic control input, operate the set of hub motors and the central propulsion system at the power level that satisfies the power demand to provide the propulsion by one of: energizing the set of hub motors and de-energizing the central propulsion system, energizing the central propulsion system and de-energizing the set of hub motors, and energizing both the set of hub motors and the central propulsion system.

4. The power delivery system of claim 2, wherein the detection module further includes instructions to, in response to loading the control setting to the parallel configuration:
   identify the attributes of the set of hub motors and the location of the set of hub motors relative to the vehicle.

5. The power delivery system of claim 4, wherein the detection module further includes instructions to monitor the vehicle for an immobile state, and
   wherein the managing module further includes instructions to, in response to detecting the immobile state:
      electronically actuate brakes that are part of the driven wheels such that torque transfers between the driven wheels, and
      operate the set of hub motors and the central propulsion system at a power level that satisfies a power demand to provide the propulsion by energizing the central propulsion system and energizing at least one hub motor of the set of hub motors according to the power rating.

6. The power delivery system of claim 2, further comprising:
   non-rotatable axles rigidly coupled to the vehicle;
   non-driven wheels rotatably coupled to the non-rotatable axles; and an additional set of hub motors structured to be selectively attached to the non-driven wheels without removing the non-driven wheels from the vehicle, wherein the managing module further includes instructions to, in response to receiving an indication of a change in the vehicle configuration associated with an arrangement of the additional set of hub motors that are selectively attachable on the non-driven wheels, manage the power delivery to the set of hub motors, the additional set of hub motors, and the central propulsion system to propel the vehicle according to the control setting.

7. The power delivery system of claim 1, wherein the central propulsion system includes at least one of an internal combustion engine and an electric motor.

8. The power delivery system of claim 1, wherein hub motors of the set of hub motors include a rotor and a stator, the rotor is mounted to one of the rotatable axles and the stator is mounted to one of the driven wheels that corresponds to the one of the rotatable axles.

9. A method for improving propulsion of a vehicle, comprising:

in response to detecting a vehicle configuration associated with an arrangement of a set of hub motors that are selectively attachable on driven wheels of the vehicle, loading a control setting according to the arrangement to one of a series configuration and a parallel configuration to indicate a power source for the driven wheels as one or more of a motor of the set of hub motors and a central propulsion system, the set of hub motors structured to be selectively attached to the driven wheels without removing the driven wheels from the vehicle;

managing power delivery to the set of hub motors and the central propulsion system of the vehicle to propel the vehicle according to the control setting; and in response to loading the control setting to the parallel configuration, calculating at least a power rating that defines maximum input power delivered to the set of hub motors according to attributes and a location of the set of hub motors.

10. The method of claim 9, wherein managing the power delivery further includes:

when in the series configuration and in response to a power demand indicated by an electronic control input, operating the central propulsion system at a power level that satisfies the power demand to provide the propulsion according to the central propulsion system, and when in the parallel configuration and in response to the power demand indicated by the electronic control input, operating at least one of the set of hub motors and the central propulsion system at the power level that satisfies the power demand to provide the propulsion by one of: energizing the set of hub motors and de-energizing the central propulsion system, energizing the central propulsion system and de-energizing the set of hub motors, and energizing both the set of hub motors and the central propulsion system.

11. The method of claim 9, further comprising, in response to loading the control setting to the parallel configuration:

identifying the attributes of the set of hub motors and the location of the set of hub motors relative to the vehicle.

12. The method of claim 11, further comprising:

monitoring the vehicle for an immobile state, and wherein, in response to detecting the immobile state, managing the power delivery to the set of hub motors includes:

electronically actuating brakes that are part of the driven wheels such that torque transfers between the driven wheels, and operating the set of hub motors and the central propulsion system at a power level that satisfies a power demand to provide the propulsion by energizing the central propulsion system and energizing at least one hub motor of the set of hub motors according to the power rating.

13. The method of claim 9, wherein managing the power delivery further includes, in response to receiving an indication of a change in the vehicle configuration associated with an arrangement of an additional set of hub motors that are selectively attachable on non-driven wheels of the vehicle, the additional set of hub motors structured to be selectively attached to the non-driven wheels without removing the non-driven wheels from the vehicle, managing the power delivery to the set of hub motors, the additional set of hub motors, and the central propulsion system to propel the vehicle according to the control setting.

14. The method of claim 9, wherein managing the power delivery to the central propulsion system includes independently managing power to at least one of an internal combustion engine and an electric motor.

15. A power delivery system for improving propulsion of a vehicle, comprising:

rotatable axles rotatably coupled to a drivetrain;

a central propulsion system rotatably coupled to the drivetrain;

driven wheels rotatably coupled to the rotatable axles;

a set of hub motors structured to be selectively attached to the driven wheels without removing the driven wheels from the vehicle, hub motors of the set of hub motors include a rotor and a stator, the rotor being mounted to one of the rotatable axles and the stator being mounted to one of the driven wheels that corresponds to the one of the rotatable axles;

a drive controller including:

one or more processors;

a memory communicably coupled to the one or more processors and storing:

a detection module including instructions that when executed by the one or more processors cause the one or more processors to, in response to detecting a vehicle configuration associated with an arrangement of the set of hub motors that are selectively attachable on the driven wheels, load a control setting according to the arrangement to one of a series configuration and a parallel configuration to indicate a power source for the driven wheels as one or more of a motor of the set of hub motors and the central propulsion system; and a managing module including instructions that when executed by the one or more processors cause the one or more processors to manage power delivery to the set of hub motors and the central propulsion system to propel the vehicle according to the control setting; and in response to loading the control setting as defined by the parallel configuration, calculate at least a power rating that defines maximum input power delivered to the set of hub motors according to attributes and a location of the set of hub motors.

16. The power delivery system of claim 15, wherein the managing module further includes instructions to:
when in the series configuration and in response to a power demand indicated by an electronic control input, operate the central propulsion system at a power level that satisfies the power demand to provide the propulsion according to the central propulsion system, and
when in the parallel configuration and in response to the power demand indicated by the electronic control input, operate at least one of the set of hub motors and the central propulsion system at the power level that satisfies the power demand to provide the propulsion by one of: energizing the set of hub motors and deenergizing the central propulsion system, energizing the central propulsion system and de-energizing the set of hub motors, and energizing both the set of hub motors and the central propulsion system.

17. The power delivery system of claim 15, wherein the detection module further includes instructions to, in response to loading the control setting as defined by the parallel configuration:
identify the attributes of the set of hub motors and the location of the set of hub motors relative to the vehicle.

18. The power delivery system of claim 17, wherein the detection module further includes instructions to monitor the vehicle for an immobile state, and
wherein the managing module further includes instructions to, in response to detecting the immobile state:
electronically actuate brakes that are part of the driven wheels such that torque transfers between the driven wheels, and
operate the set of hub motors and the central propulsion system at a power level that satisfies a power demand to provide the propulsion by energizing the central propulsion system and energizing at least one hub motor of the set of hub motors according to the power rating.

19. The power delivery system of claim 15, further comprising:
non-rotatable axles rigidly coupled to the vehicle;
non-driven wheels rotatably coupled to the non-rotatable axles; and
an additional set of hub motors structured to be selectively attached to the non-driven wheels without removing the non-driven wheels from the vehicle,
wherein the managing module further includes instructions to, in response to receiving an indication of a change in the vehicle configuration associated with an arrangement of the additional set of hub motors that are selectively attachable on the non-driven wheels, manage the power delivery to the set of hub motors, the additional set of hub motors, and the central propulsion system to propel the vehicle according to the control setting.

20. The power delivery system of claim 15, wherein the central propulsion system includes at least one of an internal combustion engine and an electric motor.

* * * * *